(12) United States Patent
Farner et al.

(10) Patent No.: US 10,198,400 B1
(45) Date of Patent: Feb. 5, 2019

(54) DATA SET SELECTION USING MULTI-SOURCE CONSTRAINTS

(71) Applicants: Jay D. Farner, Bloomfield Hills, MI (US); Regis Hadiaris, Duluth, MN (US); Jenna Bush, Berkley, MI (US); Dan Chrobak, Detroit, MI (US); Jason Tomlinson, Macomb Township, MI (US)

(72) Inventors: Jay D. Farner, Bloomfield Hills, MI (US); Regis Hadiaris, Duluth, MN (US); Jenna Bush, Berkley, MI (US); Dan Chrobak, Detroit, MI (US); Jason Tomlinson, Macomb Township, MI (US)

(*) Notice: Subject to any disclaimer, the term of this patent is extended or adjusted under 35 U.S.C. 154(b) by 0 days.

(21) Appl. No.: 15/645,801

(22) Filed: Jul. 10, 2017

Related U.S. Application Data

(60) Provisional application No. 62/530,675, filed on Jul. 10, 2017, provisional application No. 62/360,344, filed on Jul. 9, 2016.

(51) Int. Cl.

| | | |
|---|---|---|
| *G06F 17/15* | (2006.01) | |
| *G06F 9/50* | (2006.01) | |
| *G06F 17/17* | (2006.01) | |
| *G06F 17/18* | (2006.01) | |
| *G05B 19/042* | (2006.01) | |
| *G06F 17/11* | (2006.01) | |
| *H04L 12/24* | (2006.01) | |
| *G06N 5/04* | (2006.01) | |

(52) U.S. Cl.
CPC ............ *G06F 17/15* (2013.01); *G06F 9/5072* (2013.01); *G06F 17/175* (2013.01); *G06F 17/18* (2013.01); *G05B 19/0421* (2013.01); *G06F 17/11* (2013.01); *G06N 5/04* (2013.01); *H04L 41/22* (2013.01); *H04L 41/5054* (2013.01)

(58) Field of Classification Search
None
See application file for complete search history.

(56) References Cited

U.S. PATENT DOCUMENTS

| | | | |
|---|---|---|---|
| 6,523,019 B1* | 2/2003 | Borthwick | ........... G06N 99/005 706/45 |
| 9,418,337 B1* | 8/2016 | Elser | ..................... G06N 7/005 |

\* cited by examiner

*Primary Examiner* — Kakali Chaki
*Assistant Examiner* — Daniel T Pellett
(74) *Attorney, Agent, or Firm* — Kilpatrick Townsend & Stockton LLP

(57) ABSTRACT

A system for selecting an optimal data set from a plurality of candidate data sets based at least in part on a client data packet received through a web interface may include a web server that receives first data packets from a client device, and a cloud computing platform that receives the first data packets from the web server and validates the first data packets using information imported from a third-party computer system. The platform may also receive second data packets from a second third-party computer system, select candidate data sets from a collection of available data sets based on information that is descriptive of the user, and select at least one optimal data set from the candidate data sets based on a user priority. The optimal data set may include adjustable parameters with values that are set through the client device.

16 Claims, 22 Drawing Sheets

DATA SET SELECTION USING MULTI-SOURCE CONSTRAINTS

CROSS-REFERENCES TO RELATED APPLICATIONS

This application claims the benefit of U.S. Provisional Application No. 62/360,344 filed on Jul. 9, 2016, which is incorporated herein by reference. This application also claims the benefit of U.S. Provisional Application No. 62/530,675 filed on Jul. 10, 2017, which is incorporated herein by reference.

TECHNICAL FIELD

This application discloses technology related to the fields of data processing, filtering, augmentation, and selection. Specifically, this application discloses technology solutions for selecting candidate data sets from a collection of available data sets to generate an optimal result set.

BACKGROUND

Data sets may be stored in any computing medium, such as a database, data store, enumeration, collection, and so forth. With the advent of the Internet and cloud computing, these data sets may be available for remote client devices to access and evaluate. These data sets may include any collection related sets of information that is composed of separate elements, but which can be manipulated as a unit by a computer system.

BRIEF SUMMARY

In some embodiments, a system for selecting an optimal data set from a plurality of candidate data sets based at least in part on a client data packet received through a web interface may include a web server configured to receive one or more first data packets from a client device. The one or more data packets may include information that is descriptive of a user, and a priority of the user. The system may also include a cloud computing platform configured to receive the one or more first data packets from the web server; validate at least a portion of the one or more first data packets using information imported from a first third-party computer system; and receive second one or more data packets from a second third-party computer system. The second one or more data packets may be associated with the user. The cloud computing platform may also be configured to select a plurality of candidate data sets from a collection of available data sets. The plurality of candidate data sets may be selected from the collection of available data sets based at least in part on the information that is descriptive of the user from the one or more first data packets; and at least a portion of the second one or more data packets from the second third-party computer system. The cloud computing platform may also be configured to select at least one optimal data set from the plurality of candidate data sets. The at least one optimal data set may be selected from the plurality of candidate data sets based at least in part on the user priority. The at least one optimal data set may include one or more adjustable parameters. The cloud computing platform may also be configured to send the at least one optimal data set to the web server. The web server may also be configured to transmit the at least one optimal data set to the client device, and receive values for each of the one or more adjustable parameters from the client device.

In some embodiments, a method for selecting an optimal data set from a plurality of candidate data sets based at least in part on a client data packet received through a web interface may include receiving one or more first data packets from a client device. The one or more data packets may include information that is descriptive of a user, and a priority of the user. The method may also include validating at least a portion of the one or more first data packets using information imported from a first third-party computer system, and receiving second one or more data packets from a second third-party computer system. The second one or more data packets may be associated with the user. The method may additionally include selecting a plurality of candidate data sets from a collection of available data sets. The plurality of candidate data sets may be selected from the collection of available data sets based at least in part on the information that is descriptive of the user from the one or more first data packets, and at least a portion of the second one or more data packets from the second third-party computer system. The method may further include selecting at least one optimal data set from the plurality of candidate data sets. The at least one optimal data set may be selected from the plurality of candidate data sets based at least in part on the user priority. The at least one optimal data set may include one or more adjustable parameters. The method may also include transmitting the at least one optimal data set to the client device, and receiving values for each of the one or more adjustable parameters from the client device.

In any of these embodiments, any of the following features may be included in any combination and without limitation. The web server may be further configured to present a plurality of progressive web forms through the client device. The plurality of progressive web forms may be configured to receive information for the one or more first data packets. The plurality of progressive web forms may be presented dynamically based on received portions of the information for the one or more first data packets. The first one or more data packets may be combined with the second one or more data packets to form a client data packet. The cloud computing platform may be further configured to validate the client data packet against a set of validation rules. The cloud computing platform may be further configured to generate a plurality of piecewise constraint functions from at least the one or more first data packets; and apply the plurality of piecewise constraint functions to the collection of available data sets. The cloud computing platform is further configured to perform a linear regression algorithm on each data set in the collection of data sets to determine whether each data set in the collection of data sets is eliminated by the plurality of piecewise constraint functions. The cloud computing platform may be further configured to select the plurality of candidate data sets by identifying each data set in the collection of data sets that is not eliminated by the plurality of piecewise constraint functions. The cloud computing platform may be further configured to identify one or more historical user profiles that are similar to a user profile of the user; and select the at least one optimal data set from the plurality of candidate data sets by identifying one or more optimal data sets that were selected for the one or more historical user profiles. The cloud computing platform may be further configured to assign a plurality of attributes in the one or more first data packets to a plurality of factors in the plurality of candidate data sets; determine a weight for each of the plurality of factors based on relationships between the plurality attributes and the plurality of factors; and select the at least one optimal data set from the plurality of candidate data sets by calculating a score for each of the plurality of candidate data sets based on a weighted combination of the plurality of factors. The cloud computing platform may be further configured to precompute a plurality of result sets. Each of the one or more adjustable parameters may have a range of discrete possible values. Each of the plurality of result sets may include calculated values for each permutation of the range of discrete possible values for each of the one or more adjustable parameters. The plurality of result sets may be transmitted to the client device for a display that is dynamically updated in real-time as the user manipulates one or more controls without requiring an update from the web server.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for receiving client data from a client device, validating portions of the client data through a web interface, importing additional data from third-party services, and filtering the client data to form a filtered data set. The filtered data set can then be used to generate one or more constraints for a solution engine to select one or more candidate data sets. The candidate data sets can then be analyzed using a machine learning engine to identify an optimal data set having adjustable parameters. For each optimal data set, a complete result set can be calculated for each permutation of the adjustable parameters, and the complete result set can be sent back to the client device. The client device can then display the complete result set with controls corresponding to each adjustable parameter such that manipulating the controls displays cached entries in the result set such that the display can be updated without posting a new request to the server.

Figure 1:
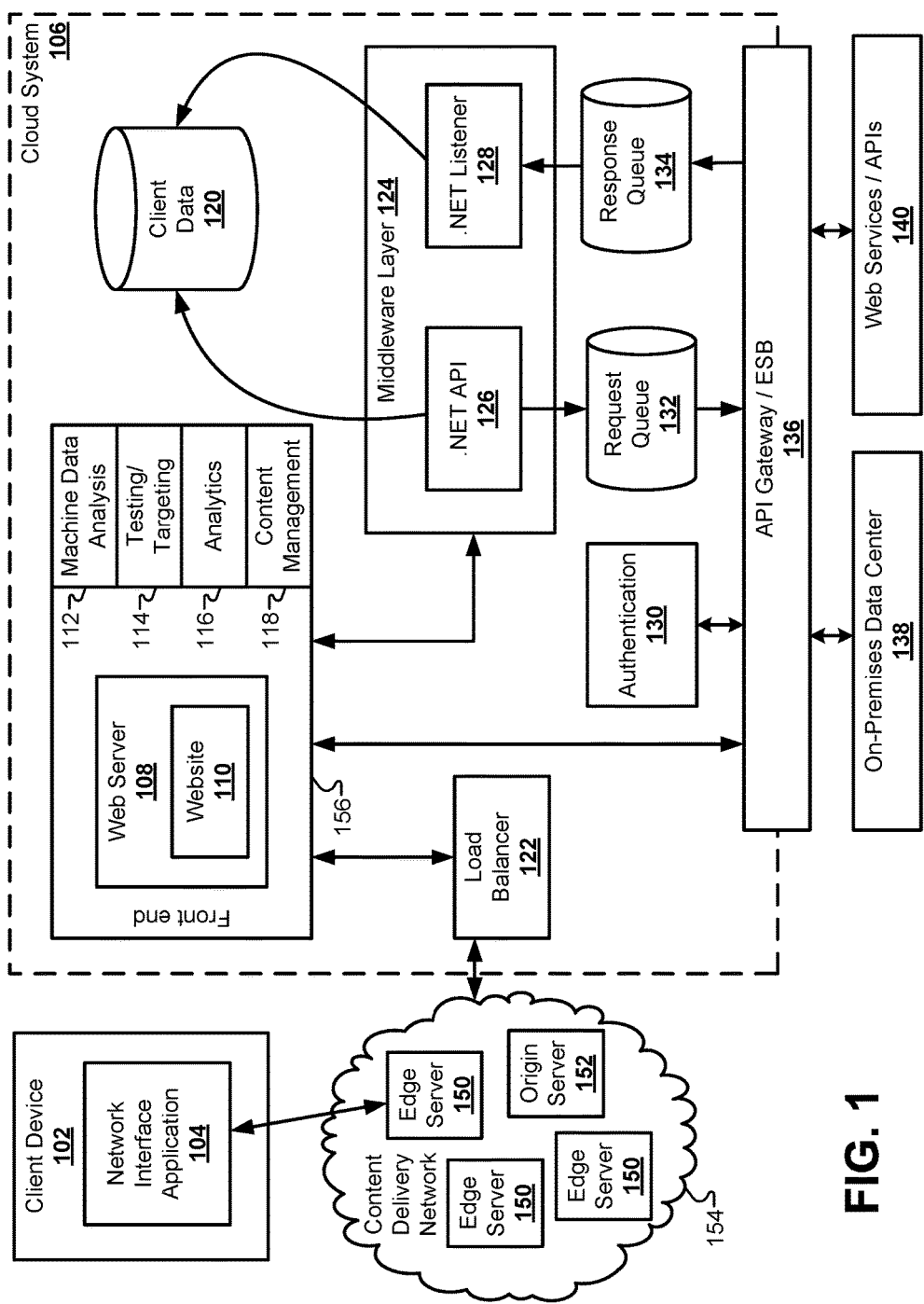
FIG. 1 illustrates a block diagram of a cloud system for receiving, importing, validating, and augmenting client data, according to some embodiments.

FIG. 1 illustrates a block diagram of a cloud system 106 for receiving, importing, validating, and augmenting client data, according to some embodiments. The client data collection process may begin with a client device 102 accessing the web server 108. The client device 102 may include a laptop computer, a desktop computer, a smart phone, a PDA, a tablet computer, a workstation, a voice-activated device or personal assistant, a watch, and/or the like. The client device 102 may be operated by a user to explore various data set options that may be available through the cloud system 106. The client device 102 may include a software application that acts as a network interface application 104 to parse and display data sent from the web server 108 and send information from the user. Depending on the particular hardware of the client device 102, the network interface application 104 may include a web browser operating on a desktop computer, an app operating on a smart phone, a voice recognition application operating on a control device, including the Google Home® or the Amazon Alexa®.

The client device 102 may communicate through a network, such as a local area network (LAN), a wide-area network (WAN), the Internet, and so forth. In the embodiment of FIG. 1, the cloud system 106 may provide content to the network interface application 104 via a content delivery network (CDN) 154. The CDN may include a plurality of edge servers 150 and at least one origin server 152 to store and distribute cached copies of the website 110 provided by the web server 108. The website 110 may include programming code, such as JavaScript, that provides front-end functionality to the website 110 when interacting with the client device 102. For example, the website 110 can collect client data that may be used to generate a result set by walking the user through a series of web forms. The client data may include information descriptive of the user, such as identification numbers. The website 110 can also use information supplied by the client device 102 to solicit information from third-party services through various APIs and/or web service interfaces. An example of a progression of web forms that collect information needed to recommend and/or approve a result set for the user is described in greater detail below. The client data may be provided in one or more data packets transmitted from the client device 102.

The CDN 154 can provide local copies of the website 110 to the client device 102 from an edge server 150 that is closer in proximity to the client device 102 than the web server 108 itself. One of the problems solved by the embodiments described herein involves the speed with which result sets can be provided and updated on the display of the client device 102. The architecture illustrated in FIG. 1 is specifically designed to increase the speed with which these results can be displayed on the client device 102 from a hardware perspective.

The website 110 is used only as an example of one of the ways that the cloud system 106 can interact with the client device 102. Therefore, this disclosure should not be limited to a website per se. Instead, the term website 110 throughout this disclosure may be replaced with any user interface capable of receiving data from the client device 102 and transmitting data to the client device. For example, another embodiment can provide a voice activated, audio interface for communicating with client devices through voice services such as Alexa® by Amazon®. Another embodiment can use an entertainment dashboard in a vehicle as an interface for communicating with the client device 102. Similarly, the web forms presented through the website 110 are also used as an example that is specific to the website 110 environment. In this disclosure, the term web form may be replaced with any sort of digital form that can present and receive information to a user through the network interface application 104. For example, the form could include interactive user interface elements displayed in an application running on a smart phone or smart watch. In another example, the form may include audio provided to a user and audio received from a user in a voice-activated user interface. Therefore, the terms "website" and "web form" are merely exemplary and not meant to be limiting.

The cloud system 106 may include a load balancer 122 that receives Internet traffic that may include client data provided from the client device 102. As used herein, the term "client data" may include any information received from the client device 102. For example, client data may include numerical values, data fields, estimates, identification numbers, addresses, user account identifiers, and so forth. As described in greater detail below, the client data received from the client device 102 may be augmented with information received from third-party web services and/or application programming interfaces (APIs). The client data may also be verified or validated using third-party validation interfaces that are external to the cloud system 106.

The cloud system 106 may include hardware elements that may be electrically coupled via a bus. The hardware elements may include one or more central processing units (CPUs), one or more input devices (e.g., a mouse, a keyboard, etc.), and one or more output devices (e.g., a display device, a printer, etc.). The cloud system 106 may also include one or more storage devices. By way of example, storage device(s) may be disk drives, optical storage devices, solid-state storage device such as a random access memory ("RAM") and/or a read-only memory ("ROM"), which can be programmable, flash-updateable and/or the like.

The cloud system may additionally include a computer-readable storage media reader, a communications system (e.g., a modem, a network card (wireless or wired), an infra-red communication device, etc.), and working memory, which may include RAM and ROM devices as described above. In some embodiments, the cloud system 106 may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The communications system may permit data to be exchanged with the network and/or any other computer described below with respect to the cloud system 106.

The cloud system 106 may also comprise software elements, shown as being currently located within a working memory, including an operating system and/or other code, such as an application program (which may be a client application, web browser, mid-tier application, RDBMS, etc.). It should be appreciated that alternate embodiments of a cloud system 106 may have numerous variations from that described above. For example, customized hardware might also be used and/or particular elements might be implemented in hardware, software (including portable software, such as applets), or both. Further, connection to other computing devices such as network input/output devices may be employed. Software of cloud system 106 may include code for implementing various embodiments as described herein.

The Web server 108 may be part of a front end 156 posted by the cloud system 106. The front end 156 may additionally include other hardware and/or software components that quantify the performance of the Web server 108. Some embodiments may include a content management system (CMS) 118 to support the creation and/or modification of digital content that is presented by the Web server 108 to the client device 102. Some embodiments may include an analytics component 116, such as a customer experience management (CEM) system that captures and analyzes the details of the experience of the user of the client device 102. Some embodiments may include a testing and targeting component 114 used to target specific users with specific content. Some embodiments may also include a machine data analysis component 112 that searches, monitors, and analyzes machine-generated big data via a web interface by capturing/indexing/correlating real-time data in a searchable repository to generate reports, graphs, and other visualizations. These components 112, 114, 116, 118 can be used by the cloud system 106 to analyze the effectiveness of the content provided by the website 110 over time.

The cloud system 106 may also include a middleware layer 124 that acts as an interface between the front end 156 and other data systems in the cloud system 106. The middleware layer 124 may perform application integration, data integration, and handle messages passed back and forth between the cloud system 106 and an on-premises data center 138 and other external systems. In the embodiment of FIG. 1, the middleware layer 124 may include an API 126 and a listener 128 for generating and receiving responses from various systems. For example, the middleware layer 124 can communicate with a client data database 120 that securely stores client data received from the client device 102. The client data database 120 can be used in conjunction with other off-cloud databases to store client data between web sessions for a particular user. The middleware layer 124 can also interface with a request queue 132 and a response queue 134 of the cloud system 106. The request queue 132 can store messages passed from the middleware layer 124 to other systems both inside and outside the cloud system 106. Similarly, the response queue 134 can receive messages passed from other systems to the middleware layer 124.

Some of the external systems that interface with the cloud system 106 may include the on-premises data center 138 and one or more Web services and/or APIs 140. To interface with these external systems, the cloud system 106 may include an API Gateway or Enterprise Service Bus (ESB) to provide a central point for managing, monitoring, and accessing exposed Web services. Data can be passed from the middleware layer 124 to the API Gateway/ESB 136 through the request queue 132 and/or the response queue 134. Additionally, the front end 156 may communicate directly with the API Gateway/ESB 136.

To collect the client data from the client device 102, the website 110 may present a series of dynamic web forms to the network interface application 104. Before, during, and/or after this process of collecting client data begins, the cloud system 106 may require the user to establish a user account with the cloud system 106. Some embodiments may include an authentication module 130 that authenticates an identity of a user of the client device 102. The authentication module 130 may communicate with the data center 138 through the API Gateway/ESB 136.

Figure 2:
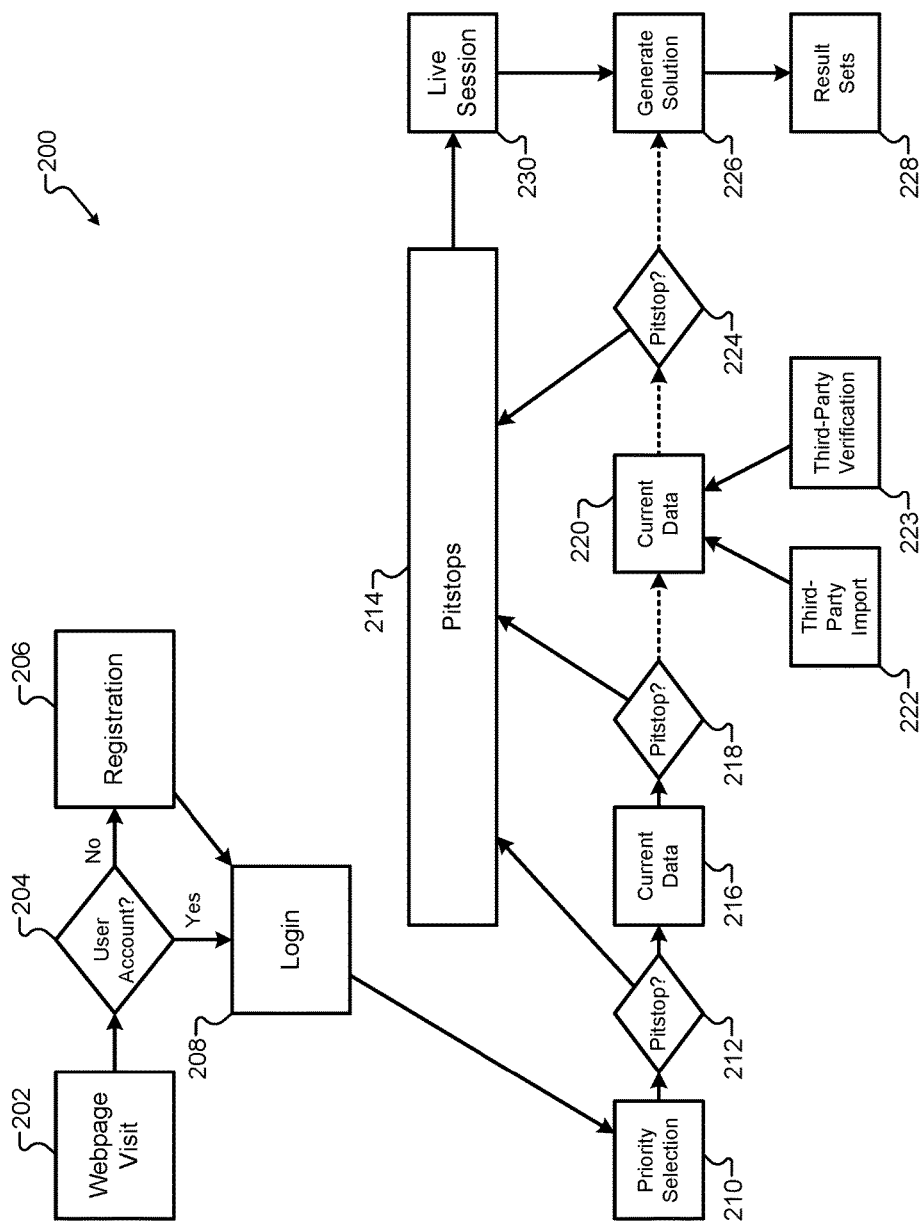
FIG. 2 illustrates a flowchart of a process for retrieving the client data from the client device, according to some embodiments.

FIG. 2 illustrates a flowchart 200 of a process for retrieving the client data from the client device 102, according to some embodiments. The process may begin with a visit to the website 110 through the network interface application 104 (202). The cloud system 106 may determine whether a user account (204) exists and/or is required before or during the client data retrieval process. If a user account is required and does not exist, a registration process (206) can be provided to the client device 102. After the user account is ready, the user can login (208) to the cloud system 106. Providing a user account can save the state of the client data during and after the session with the client device 102. This allows the user to continue an interrupted web session at a later time.

The website 110 may provide a plurality of web forms 210, 216, 220, 226 that are dynamically presented to walk the user through the client data retrieval process. Each of the plurality of web forms 210, 216, 220, 226 may include various controls, such as drop-down boxes, radio buttons, text fields, checkboxes, and so forth, that allow users to enter the client data for the cloud system 106. For example, a first type of web form 210 may present questions and/or web controls that allow a user to select a priority to be used when selecting the result sets. A plurality of possible priorities may be presented to the user on the first type of web form 210, including a priority that emphasizes a rate over other priorities. The possible priorities may also include a priority that emphasizes an amount over other priorities. The possible priorities may additionally include a priority that emphasizes a time interval over other priorities. As will be described below, the one or more selected priorities in the client data may be used to select an optimal data set from a plurality of candidate data sets.

A second type of web form 216 may allow a user to provide current data values to be used to select an optimal result set. Current data values may include a current state of various variables that change over time, and may include identifiers, values, amounts, rates, time intervals, addresses, estimates, account identifiers, and so forth. The current data values may also include personal information that identifies and/or describes the user. The current data values may also include values that describe a geographic location. The second type of web form 216 may be presented as a plurality of web forms that are dynamically adjusted based on data provided in a previous web form. For example, the data provided in a previous web form can be used to dynamically adjust the information requested in a subsequent web form. Based on the user's answers, certain questions, fields, or web forms may be added and/or omitted from the web form sequence presented by the website 110. Thus, the current data collected by the second type of web form 216 may be divided into categories (e.g., data descriptive of a geographic location, data descriptive of the user, data descriptive of a user profile, etc.), and each category may be selectively presented in separate web forms or groups of web forms.

Some of the current data collected by the second type of web form 216 may include information that provides status information for the user that in turn may make certain data sets available to the user. The status information for the user can be used to make certain data sets available/unavailable to the user. After receiving such status information, the system can add indicators or data fields to the client data indicating the status. As will be described below, these indicators are data fields may be used by a solution engine to generate constraints that eliminate at least a portion of the available data sets from evaluation.

The presentation of web forms may also include a third type of web form 220 that allows the client device 102 to submit additional current data provided by the user. The third type of web form 220 can receive current data from the user that may require some form of verification before it is used in the selection of a data set or the generation of a result set. Prior to this disclosure, such data verification could take days or even weeks to perform. This generally discouraged users from completing the web session and generating a client data packet. To solve this and other problems, the embodiments described herein may use a third-party verification interface 223 to verify the client data provided from the client device 102. The third-party verification interface 223 may, for example, retrieve a history of data values from other computer systems that can be used to generate an estimate of certain fields in the third type of web form 222 provided by the user. For example, the third-party verification interface 223 may provide a verified value to the cloud system 106, and the data provided from the client device 102 may be verified if that data falls within a predetermined range of the verified value. This data verification step allows for greater accuracy and reliability when selecting candidate data sets and generating result sets for the client device 102.

The third type of web form 220 may also include a third-party import interface 222 that retrieves data that can be used to supplement, correct, and/or verify information provided from the client device 102. Depending on the complexity of the web session, some users may be unwilling to manually enter all of the client data requested by the website 110. Other users may enter incorrect information accidentally or purposefully. The third-party import interface 222 provides an alternative to previous systems that required the user to manually provide all current data through the client device 102. Instead, the third-party import interface 222 can select at least a portion of the current data provided to the third type of web form 220 to automatically download a portion of the current data from the third-party import interface 222. For example, instead of manually typing current data values into the third type of web form 220, the cloud system 106 can instead use a user identifier and/or user credentials to download a portion of the current data automatically through the third-party import interface 222. This process can decrease the amount of time required for the user to progress through the plurality of web forms, and can reduce user-injected errors into the client data. Information may be imported from the third-party import interface 222 as data packets. The third-party import interface 222 may access a third-party computer system that provides the imported data.

As we described in greater detail below, after the client data is collected from the client device 102 and optionally supplemented/verified by data from the third-party import interface 222 and the third-party verification interface 223, the system can use the client data to generate a solution 226 that includes one or more result sets 228. Between each of the web forms presented by the website 110, the system may include a "pitstop" check where the data provided by that particular web form undergoes a validation check. Each of the pitstop checks 212, 218, 224 may include data validation checks that ensure the data entered by the user falls within a permissible range of values. For example, a percentage value may allow valid decimal values between 1.00 and 10.00. A pitstop following a web form that receives that percentage value may determine whether the percentage value entered by the user falls within the specified range. If any of the data provided by the client device 102 does not pass the pitstop check, the system can execute a pitstop routine 214 that informs the user of the error and allows a correction to be made. Alternatively, the pitstop routine 214 can determine that a live session 230 may be needed to replace the automated web session before generating the result sets 228.

It will be understood that the designators "first/second/third" used to describe various types of web forms that may be presented to the client device 102 are used to distinguish one web form from the others. These terms do not imply an order, importance, or precedence that would require any specific manner for the web forms to be presented. Additionally, each type of web form may include a plurality of specific web forms that are intermingled and presented in a mixed order to the client device. Some embodiments may include more than three types of web forms, while other embodiments may include fewer than three types of web forms.

Figure 3:
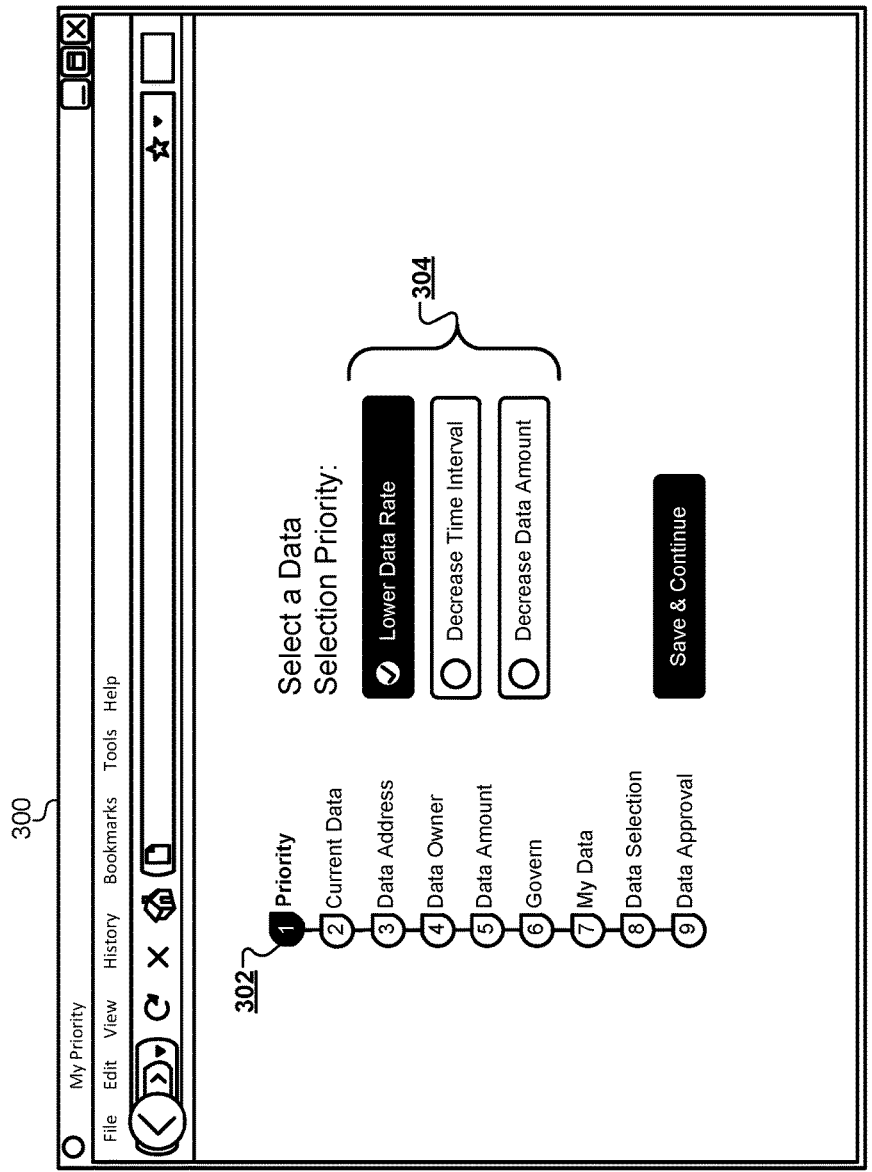
FIG. 3 illustrates an example of the first type of web form for receiving a priority level, according to some embodiments.

FIG. 3 illustrates an example of the first type of web form 210 for receiving a priority level, according to some embodiments. A web browser 300 may display the first type of web form 210 on a display of the client device 102. A progress indicator 302 may show the user an estimated number of web forms that will be presented during the session. The progress indicator 302 may also display a current level of progress through the number of web forms. The web browser 300 may also display a plurality of predetermined priority levels 304 from which the user can select a priority level that will be used when generating result sets. For example, some result sets may prioritize a lower rate versus a lower amount. Other result sets may prioritize longer or shorter time intervals associated with the result set. The web browser 300 may present the plurality of predetermined priority levels 304 such that only a single priority level may be selected through the client device 102 and added to the client data.

Figure 4A:
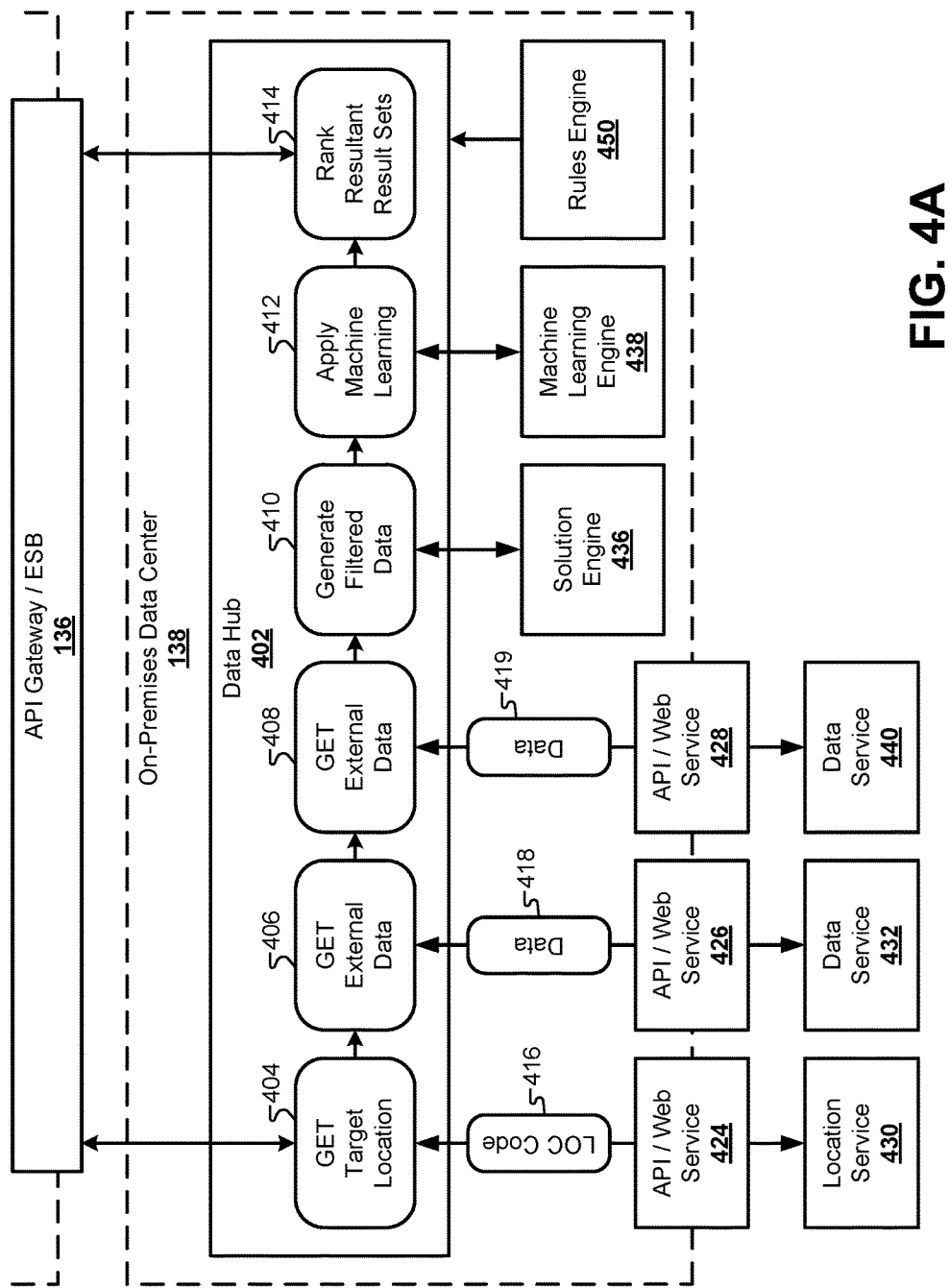
FIG. 4A illustrates a block diagram of a data center that may be used in conjunction with the cloud system, according to some embodiments.
Figure 4B:
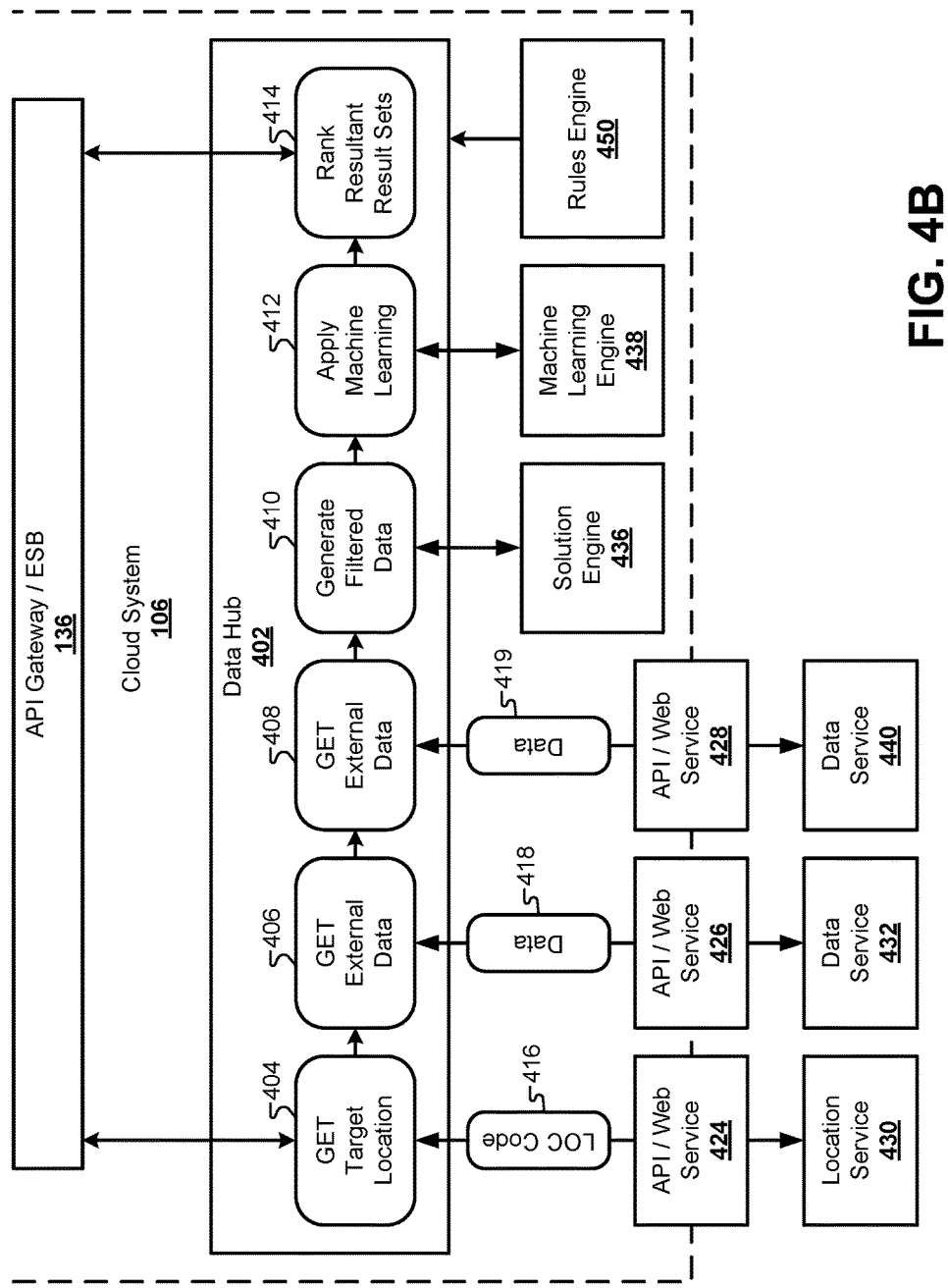
FIG. 4B illustrates an architecture where the software/hardware components from the data center are instead located in the cloud system.

FIG. 4A illustrates a block diagram of a data center 138 that may be used in conjunction with the cloud system 106, according to some embodiments. In this embodiment, the cloud system 106 may be separate from the data center 138. For example, the data center 138 may be physically hosted by an entity that generates the result sets to the client device 102, while the cloud system 106 may be hosted by a cloud service provider that is different from the entity providing the data center 138. However, in other embodiments, the functionality provided by the data center 138 may also be located in the cloud system 106. Some embodiments may duplicate the functions described below for the data center 138 in both the cloud system 106 and the data center 138. Therefore, the bifurcation of the system between FIG. 1 and FIG. 4A is done by way of example and not meant to be limiting. Other embodiments may divide the functionality described herein between the cloud system 106 and the data center 138 in any combination of functions without limitation. For example, FIG. 4B illustrates an architecture where the software/hardware components from the data center 138 are instead located in the cloud system 106.

The data center may include various databases that store client data, along with systems that provide content for the cloud system 106. To generate solutions based on the received client data, the data center 138 may include a data hub 402 that receives a packet of client data from the cloud system 106 and generates one or more result sets that are transmitted back to the cloud system 106. The data hub 402 may act as a central aggregator of the client data that finalizes the client data packet for generating a solution. Specifically, the data hub 402 may be made up of a plurality of processes that augment, format, filter, and process the client data in such a way that a solution engine 436 and a machine learning engine 438 can generate an optimal result set.

In some embodiments, the data hub 402 can augment the client data by executing a process 404 that requests a location code 416 from a location service 430 through an API/web service 424. The location code may designate a general geographic area to be associated with the client data. The data hub 402 may also include a process 406 that uses the location code retrieved from the location service 430 to retrieve rules or penalties 418 that may be applied to the candidate data sets based on location. The process 406 can send the location code through an API/web service 426 to a data service 432 specifically configured to provide such rules or penalties 418 for candidate data sets. These may include a cost that is applied to the data set based on the location from the location service 430. In some embodiments, a process 408 may retrieve additional data 419 from a data service 440 through an API/web service 428. The data 419 received from the data service 440 may include a rating for the user that may influence which particular candidate data sets that may be available to the user. The data service 440 may include a third-party service that provides a rating for the user that is based at least in part in some of the values provided in the client data from the user, as well as a previous history of the user.

After augmenting the client data, the data hub 402 can include a process 410 to generate a set of filtered data. As used herein, the term filtered data may refer to a specific subset of the augmented client data that is formatted for submission to the solution engine 436. The filtered data can be used by the solution engine 436 to filter out candidate data sets from a collection of available data sets that are not available to the user. For example, at this stage, the client data may include an exhaustive list of information that may be needed later by the system in future web sessions. However, much of the client data may not be needed at this stage of the process for filtering the collection of available data sets. Therefore, the process 410 can select a subset of the information in the client data, format the filtered data accordingly, and send the formatted subset of the client data to the solution engine 436. In response, the solution engine can provide a plurality of candidate data sets from the collection of available data sets for consideration by the data hub 402.

Next, the data hub 402 can select one or more optimal data sets from the plurality of candidate data sets through a process 412 that accesses a machine learning engine 438. The machine learning engine 438 can use additional information from the filtered and/or client data. For example, the solution engine 436 may provide a plurality of data sets that are available to the user based on the filtered client data. The machine learning engine 438 can select an optimal subset of the available data sets to be transmitted back to the client device 102. A process 414 can then rank the result sets by type and send the result sets to the cloud system 106 for transmission to the client device 102.

The data hub 138 may govern the overall process of collecting the client data, determining which, if any, portions of the client data are missing or invalid, and calling upon external services to augment the client data with additional information. For each field in the client data, a rules engine 450 can execute a validation rule to ensure that the client data is valid (e.g., "is the value of the rate field greater than 0.00?"). The rules engine 450 can also determine which external data services may be used to retrieve data that is missing from the client data packet. For example, a rating from an external rating service may be required before candidate data sets can be selected. If the rules engine 450 determines that the client data set is missing this rating, it can cause the process flow of the data hub 402 to make a request to the external rating service to retrieve a rating for the user. Overall, the rules engine 450 can orchestrate the process flow of the different processes 404, 406, 408, 410, 412, 414, etc., in the data hub 402.

Figure 5:
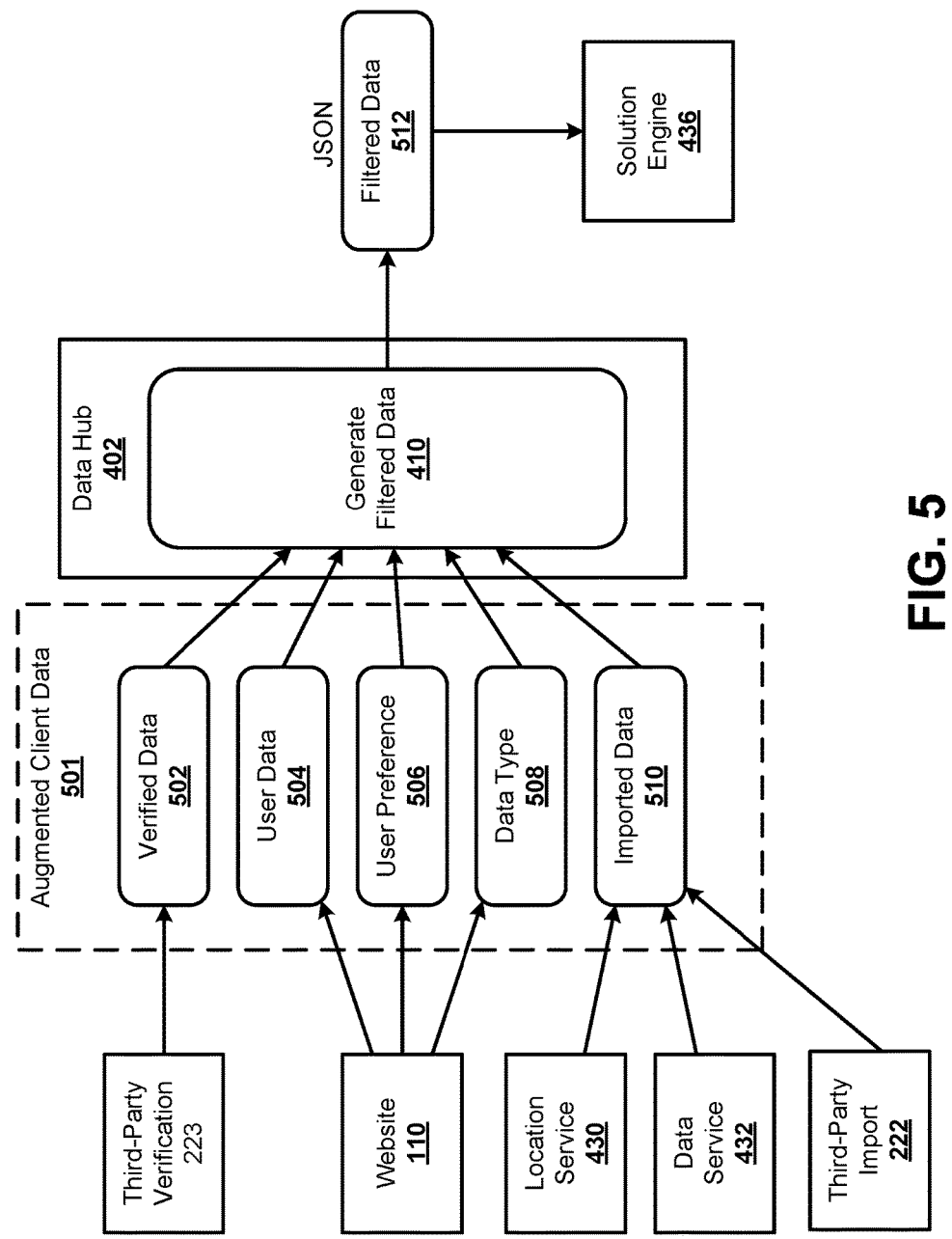
FIG. 5 illustrates a summary diagram of how the filtered data can be generated from the augmented client data, according to some embodiments.

FIG. 5 illustrates a summary diagram 500 of how the filtered data can be generated from the augmented client data, according to some embodiments. Diagram 500 represents a single example of how the augmented client data can be collected from various sources and provided to the data hub 402. FIG. 5 represents a summary of the way in which the client data is accumulated and generated from the beginning of the web form process to the generation of the filtered data for the solution engine 436.

The augmented client data 501 may include verified data 502. The verified data 502 may include data provided by the client device 102 that is verified to be correct from a third-party verification interface 223. The augmented client data 501 may also include user data 504 that is provided by the user through the website 110. The website 110 may also provide user preferences, including the user priorities described above. Additionally, the website may provide information that is indicative of a data type 508. The data type may be explicitly provided from the user, and/or may be derived by the system based on data provided by the user. For example, a user may provide information indicating personal information that would make the user eligible for different data sets based on the personal history of the user. The augmented client data may also include imported data 510 that is received from, for example, the location service 430 and/or the data service 432 from FIG. 4A/B. The imported data 510 may also be received from the third-party import interface 222 of FIG. 2 for importing information that may otherwise be available to the user, but is imported for user convenience and accuracy.

The data hub 402 can internally validate the augmented client data 501 and ensure that the augmented client data 501 is complete. If additional data fields are required by the data hub 402 to generate the filtered data, the data hub 402 can send an indication back to the Web server 408 to request such information from the client device 102. Process 410 for generating the filtered data can select the specific subsets of the augmented client data 501 required for the particular solution engine 436. In some embodiments, different versions of the solution engine 436 may be available to the data hub 402, and the process 410 can select data fields from the augmented client data 501 required by each solution engine 436. Additionally, each solution engine 436 may have different formatting requirements, and the process 410 can ensure that the filtered data 512 is formatted according to the requirements of the selected solution engine 436.

Figure 6:
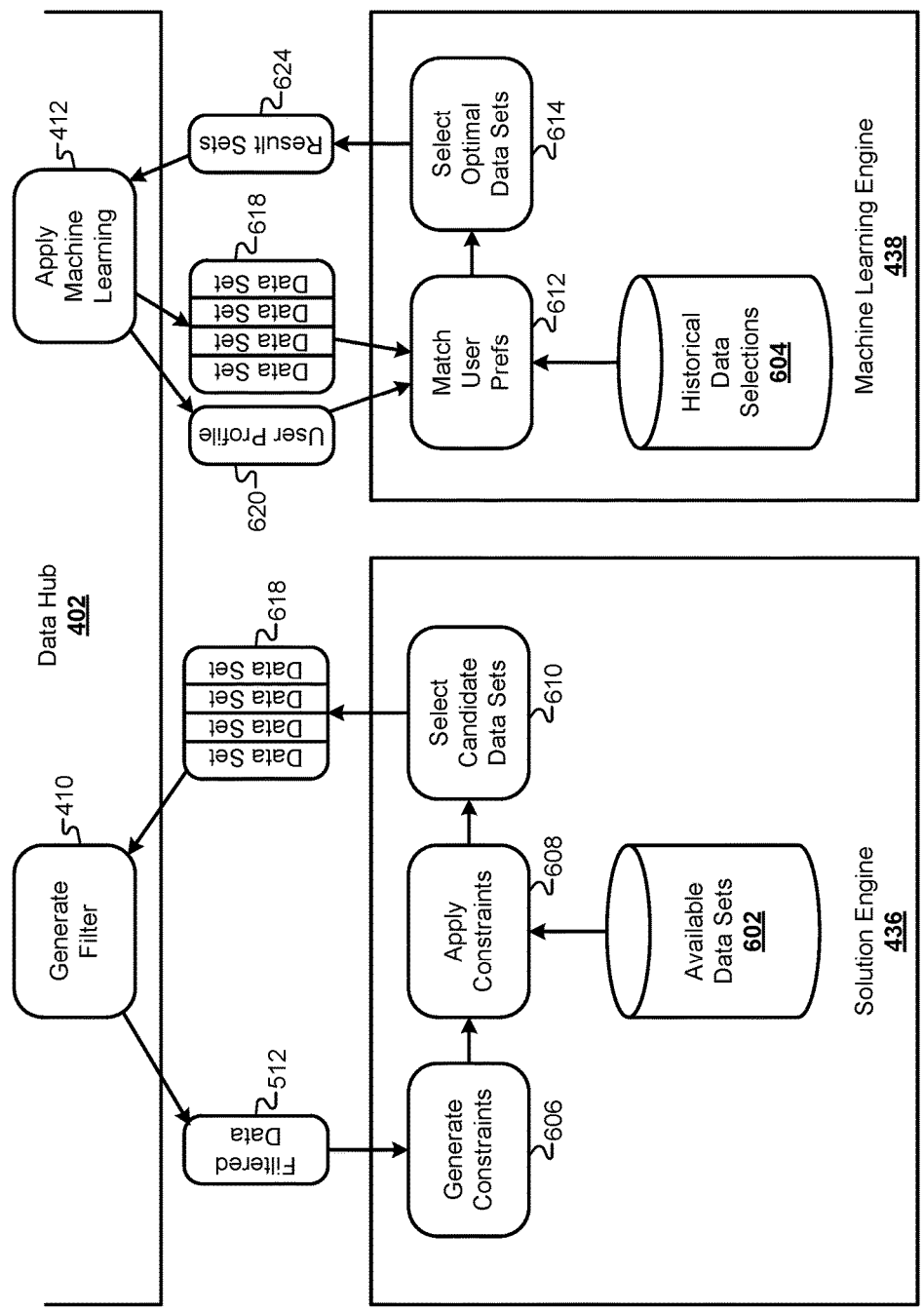
FIG. 6 illustrates a block diagram of how the solution engine 436 and the machine learning engine generate result sets, according to some embodiments.

FIG. 6 illustrates a block diagram of how the solution engine 436 and the machine learning engine 438 generate result sets 624, according to some embodiments. The filtered data 512 can be passed to the solution engine 436, and process 606 can use the filtered data 512 to generate a plurality of rules and subsequent constraints to be applied to the available data sets. As described in greater detail below, the process 606 can use fields in the filtered data 512 to eliminate subsets of the available data sets, which can be expressed in constraints statements.

For example, the data type 508 determined as described above in FIG. 5 may be used to eliminate certain data sets from the collection of available data sets. In some embodiments, the collection of available result sets may be categorized according to a type that may correspond to the data type in the filtered data 512. One or more constraint expressions may be constructed by the process 606 that would eliminate available data sets associated with that particular data type from the collection of available data sets for this particular set of filtered data 512.

After generating the constraints, the solution engine 436 can execute a process 608 that applies the constraint statements to the collection of available data sets. The collection of available data sets may be stored in a database 602, and may include thousands of different data set options. Data sets may be categorized based on a time interval, a rate, a source, and so forth. Data sets may also be categorized based on eligibility of the user based on the augmented client data 501. In some embodiments, the constraint expressions can be applied in a single pass to each individual available data set; however, other embodiments may apply constraint expressions in multiple passes through the available data set. After the constraints are applied, a linear regression method 610 can be used to generate a set of candidate data sets 618. These candidate data sets may represent data sets for which the user may be eligible.

Next, the candidate data sets 618 can be provided to the machine learning engine 438. The machine learning engine can analyze the candidate data sets 618 and select one or more optimal data sets 614 from the candidate data sets 608. The machine learning engine 438 can use a collection of historical data selections 604 to determine the optimal data set(s) 614. For example, the client data provided by the user may be used to generate a user profile. The machine learning engine 438 can compare the user profile for this particular user to user profiles for previous web sessions associated with different users. The data set selections of previous users can then be used to determine which of the candidate data sets 618 would most likely be chosen by the current user.

For example, after each web session, the machine learning engine 438 can store the optimal data sets presented to each user, along with which of the optimal data sets was selected by each user in the collection of historical data selections 604. Additionally, the machine learning engine 438 can store the user profile derived from the augmented client data for each user with the selection information. When a new plurality of candidate data sets 618 is received for a new user, the augmented client data can be used to generate a similar user profile. In the example of FIG. 6, a set of values can be extracted from the augmented client data 501 to generate a user profile 620. The user profile 620 can be matched to one or more historical user profiles. The final selections made by the users associated with the matched historical profiles can then be used to influence the selections made from the candidate data sets 618 for the current user. For example, if a number of previous users all selected certain types of optimal data sets that were presented, the previously selected optimal data sets can be ranked higher, based on this prior selection data. In essence, the machine learning engine 438 may use the expressed preferences of previous users to determine which of the candidate/optimal data sets are most likely to be selected by the current user.

Figure 7:
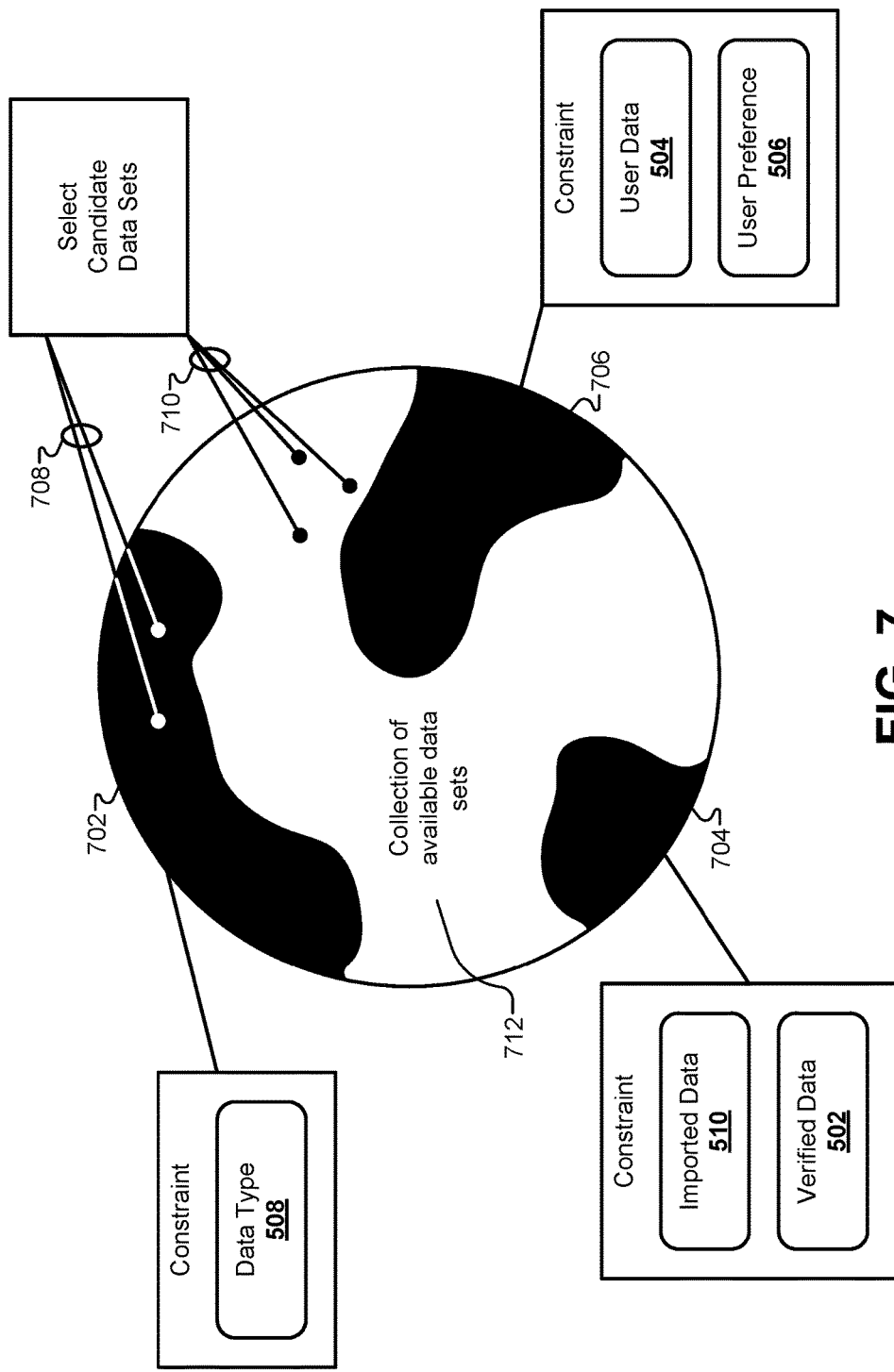
FIG. 7 illustrates a representation of how candidate data sets can be selected from the collection of available data sets, according to some embodiments.

FIG. 7 illustrates a representation of how candidate data sets can be selected from the collection of available data sets, according to some embodiments. In some embodiments, a Rete algorithm may be used to identify candidate data sets from the collection of available data sets. Specifically, a linear tree-based structure can be formed to represent how rules would be applied to the collection of available data sets. Rules can be derived that describe available data sets for which the user may be eligible. Each rule can be executed individually to traverse each node in the linear tree structure to eliminate any of the available data sets for which the user is not eligible.

Using a Rete algorithm exhaustively evaluates each rule against the available data sets. However, using a Rete algorithm may have a number of drawbacks. First, the linear representation must be traversed individually for each rule. For very large collections of available data sets, this operation has been found to take between approximately 30 and 60 seconds for very large collections of available data sets. For users interfacing with the system through a web interface, waiting 30 to 60 seconds may be too long to wait, and may cause users to drop out of the process prior to receiving their result sets. Second, many users may want to increase one or more values in their client data and determine whether they would be eligible for similar result sets. For example, users may wish to increase a particular data value to 105% of its original value. Each time such a proposed increase would be submitted, the Rete-based algorithm needs to iteratively increment the proposed value and re-evaluate the collection of available data sets to see which data sets remain available in the collection of available data sets.

FIG. 7 illustrates a more efficient approach for identifying eligible data sets from the collection of available data sets by using a constraint-based formulation. Overall, the information in the client data sent from the client device 102 can be used to streamline a set of constraints. This information may include information that is descriptive of the user, such as amounts, rates, values, identifiers, and so forth. To build constraints, various fields in the filter data set can be used to generate piecewise rule functions that can be applied together to the full collection of available data sets 712. For example, a data type 508 from the filtered data can be used to identify a particular subset of the collection of data sets for which the user is not eligible. This can be used to generate a rule expression, such as [TYPE !=A]. Similarly, some data set types may be associated with certain data field ranges that are required for that type of data set. For example, one type of data set may require field value in the filter data set to be [FIELD_1>75,000 && FIELD_1<417,000]. The rules engine can generate rule expressions based on any of the values in the filtered data. In another example, rules can be generated from imported data 510 and/or verified data 502. An external rating service may provide a rating for user, and a rule may be formulated such as [RATING >720]. Other data sets may only be available if certain data fields in the filter data set have been verified by an external verification interface, generating a rule such as [FIELD_3.VERIFIED==TRUE]. Other rules may be generated based on user data 504 and/or user preferences 506. For example, some of the collection of available data sets may be grouped together based on time intervals and/or rate values. If the user preference indicates that they are looking for a time interval of approximately 30 years with a rate variable that does not change, then a rule may be formulated such as [INTERVAL==30 && R==FIXED] Many different rule formulations are possible based on different collections of available data sets and different requirements for determining eligibility for such data sets. Therefore, the rules listed above are not meant to be exhaustive, but rather are meant to provide an example that may be used as a guide in implementing the formulation of rule sets in individual systems.

After generating a list of rules comprised of piecewise functions across the spectrum of allowable variable values, the rules can be used to generate constraints on the collection of available data sets 712. FIG. 7 graphically illustrates how these constraints can be used to eliminate portions of the solution space in the collection of available data sets 712. For example, a constraint based on the data type 508 can be used to generate constraint 702 that eliminates a portion of the solution space. Similarly, other constraints 704, 706 can be used to eliminate other portions of the solution space based on other rules generated from the filtered data.

To identify candidate data sets 710 that remain unconstrained in the collection of available data sets 712, a linear regression algorithm can be used on each candidate data set. The end result of the linear regression algorithm, combined with the constraints on the collection of available data sets is a mathematical operation that only needs to be executed one time through the collection of available data set 712. This single pass can identify constrained data sets 708 for which the user should not be considered eligible, along with unconstrained data sets 710 for which the user should be considered eligible.

By using constraints and linear regression, the time to identify candidate data sets can be reduced from 30-60 seconds down to less than 1 second. This dramatically reduces the amount of processing power and memory required to execute these operations, and greatly reduces the amount of time that the user must wait before seeing their result sets. Additionally, prior to this disclosure, manually evaluating result sets inevitably resulted in not discovering the full spectrum of available data sets that may be candidates for the user. When dealing with thousands of possible data sets, it was simply impossible for a human user to duplicate the operations of the special-purpose system described herein. The constraint and linear regression algorithm identifies the full set of data sets for which the user is eligible, and thereby guarantees that optimal solutions are not inadvertently eliminated from consideration during this phase. Instead, the identified candidate data sets are holistically evaluated and entirely complete.

The data sets that are selected as candidates from the pool of available data sets may include adjustable values that can be manipulated by the user, as well as other values that are calculated based on inputs provided from the client device 102. Thus, selecting candidate data sets may not be comprised of simply selecting data sets with predefined values. Instead, the pool of available data sets may represent a solution space with a very large number of individual values that may populate the available data sets in various permutations. The process of selecting candidate data sets may include selecting types of data sets from the collection of available data sets, and then determining one or more specific values for those candidate data sets based on the inputs provided by the client device 102.

The following example describes a single scenario to illustrate how rule sets can be combined to form constraints, and how a linear regression can be used to determine values for fields in the candidate data sets from the collection of available data sets. In this example, each data set may include an amount field, an amount ratio field, and a point field, along with a plurality of other fields, some of which may be referenced below. The point field may be determined by a set of rules, and may depend on determined values for the amount field and the amount-ratio field. Some sample rules for the point field may include the following pseudo code, which may depend on the value of the amount field, along with a requestor value from the client data.

IF amount>=75 AND
    amount<100 AND
    Requestor IN "Sample System"
    THEN point −=0.125//"amount 75-99"
    IF amount>=100 AND
    amount<125 AND
    Requestor IN "Sample System"
    THEN point −=0.25//"amount 100-124"

Additionally, the point field may also be associated with other rules that set the value of the point field based on other variable values, such as the amount-ratio field. For example, these other rules may include the following pseudo code rules, which depend on a value in the amount-ratio field, a value of a source field, and value of a NumUnits field.

IF Source IN source1 AND
    NumUnits IN 3, 4 AND
    (amount-ratio <=0.85 AND amount-ratio >0.8)
    THEN point +=1.5//"3-4 units & amount-ratio>80<=85"
    IF Source IN source1 AND
    NumUnits IN 3, 4 AND
    (amount-ratio <=0.9 AND amount-ratio >0.85)
    THEN point +=2//"3-4 units & amount-ratio>85<=90"

To determine a final value for the amount field, some embodiments may use a brute-force method that makes an initial guess at the final value for the amount field, and then runs through a complete set of calculations for each rule. Because of the different rules and the interrelationship between field values, this process includes recursive calculations that solve for the final value for the amount field, then change the value for the point field accordingly. When changes are made to either value when solving using this relationship, the entire recursive process may need to start over again from the beginning. In some cases, this process can take as long as 30-60 seconds for large collections of data sets.

In the embodiment of FIG. 7, the process can be altered to work much more efficiently because the rule sets can be merged into piecewise constraint functions and evaluated a single time for each available data set using a linear regression step. This may involve a pre-engine step where a common validation set up occurs. Continuing with the example above, the pre-engine step can set the main unknown/ambiguous field to be the amount-ratio field. Following the pre-engine step, a rule set phase of the algorithm may be executed. The rule set phase may take each property (e.g., the amount field) with associated its associated transform(s) and change the property to its transformed representation. For example, IF amount-ratio >=75/PropVal AND
    amount-ratio <100/PropVal AND
    Requestor IN "Sample System"
    THEN point −=0.125//"amount is 75-99"
    IF amount-ratio >=100/PropVal AND
    amount-ratio <125/PropVal AND
    Requestor IN "Sample System"
    THEN point −=0.25//"amount is 100-124"

In this algorithm, a "variable" may represent an object that is comprised of two parts: conditions and outcomes. Conditions may include Boolean expressions, and outcomes may include other conditions or actions. If the result of the condition is already known (e.g., Request or IN "Sample System"), then it may be substituted with its known outcome (e.g., true/false). If the outcome is unknown or ambiguous, then the condition need not be evaluated. Evaluated conditions can then be converted into constraints. Each constraint can then be added to a variable's "part list." In the end, rule collections for each data set may have many different rule sets, and a given rule set may be associated with many different data sets.

Next, a given rule set can be converted to a binary tree with a plurality of nodes. Each node in the binary tree may represent potential actions that may be executed. For example, the rules described above for the variable representing the value of the point field may be described as follows:

GIVEN: Requestor="Sample System", Source=source1, NumUnits=3, PropVal=100.
    IF amount-ratio >=0.75 AND amount-ratio <1
    THEN point −=0.125//"amount is 75-99"
    IF amount-ratio >=1 AND amount-ratio <1.25
    THEN point −=0.25//"amount is 100-124"
    IF amount-ratio <=0.85 AND amount-ratio >0.8
    THEN point +=1.5//"3-4 Units & amount-ratio>80<=85"
    IF amount-ratio <=0.9 AND amount-ratio >0.85
    THEN point +=2//"3-4 Units 7 amount-ratio>85<=90"

Each of these constraints may be derived from the rules sets described above. Note that if an outcome is known to be false (e.g., Requestor IN "Other Sample System"), then these constraints do not need to be set up for that particular set of client data. In other words, if inputs from the client data make the "GIVEN" statement evaluate false, then these constraints do not need to be generated. Thus, the constraints that need to be set up will be different for each set of inputs received by the solution engine, because these inputs may be based on the client data received during each session.

After the rule set execution stage, the algorithm may next include a post-engine stage. In the post-engine stage, the relevant constraint trees can be merged for each data set. Note that the example above only describes the rules/ constraints for the point variable representing the value of the point field in the data set. Determining data set values may include many different variables that represent unknown properties at the time of the rule set execution stage. In the post-engine stage, the algorithm can merge variables from individual rule sets. For example, evaluation of the point variable with respect to the amount-ratio field yields a piecewise function with values for the amount-ratio field as, for example, the x-axis, and values for the point field as the y-axis. Each row may represent a "piece" of the piecewise function. Pieces that overlap can be added together to create a single piecewise function. This is possible because the action of the "THEN" clause is additive, only adding/subtracting values to/from a current value in the corresponding field. In the example above, the piecewise function may include amount-ratio ranges from 75-80, 80-85, 85-90, 90-100, and 100-125, with each range cumulatively adding the aggregate increment to the point field for each rule.

The piecewise functions for each variable in a data set can be combined to generate an expression for the final value in the amount field that is weighted by the value in the point field, along with other fields that involve recursive, dependent relationships. The algorithm can take each piecewise function's intersection with a linear function with a slope of the PropVal value provided by the client data. The X/Y coordinates of this intersection represent valid final values for the amount field, along with a corresponding value of the final value of the amount-ratio field. In some embodiments, the algorithm can pick the lowest value for the amount field and use that value to determine any remaining fields of interest in the data set.

Figure 8:
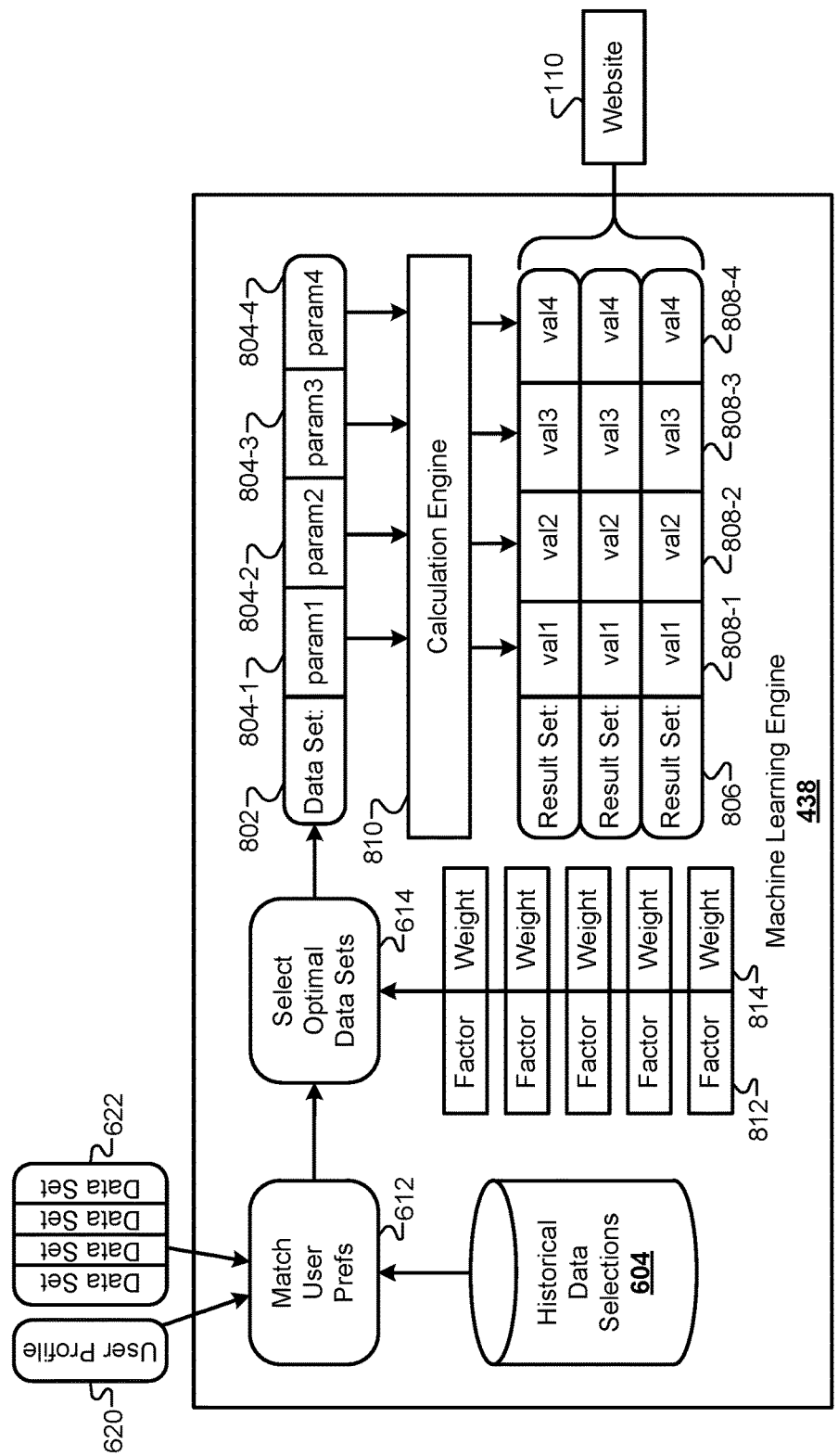
FIG. 8 illustrates a process diagram illustrating how the machine learning engine evaluates the candidate data sets to identify an optimal data set and generate complete result sets, according to some embodiments.

FIG. 8 illustrates a process diagram illustrating how the machine learning engine 438 evaluates the candidate data sets 622 to identify an optimal data set and generate complete result sets, according to some embodiments. As described above, some embodiments of the machine learning engine 438 can match a profile 620 of a user based on the client data to one or more historical user profiles to determine which of the candidate data sets 622 the user would most likely consider to be optimal. The historical data selections 604 can be based on result sets that were actually presented to previous users, and then accepted by previous users and used to move forward. In some embodiments, the optimal data set can be selected based on a priority identified by the user in the client data that received as part of the data packets sent from the client device 102. In effect, this can select the candidate data set that best lines with the user priority. For example, previous user profiles that had similar priorities and other similar characteristics can be matched with the priority of the current user to select the optimal data set that was historically selected in such cases.

In some embodiments, the machine learning engine 438 may alternatively or additionally select an optimal data set by identifying attributes in the client data set, correlating those attributes in the client data set to a set of factors 812, then appropriately weighting those factors to identify the optimal data set in the candidate data sets 622. For example, an attribute may include a high rating of a user by an external rating service. This attribute may be correlated to a factor that identifies candidate data sets with a very low rate variable. Another attribute may include a value in a field that is above a threshold amount. This attribute may be correlated to a factor of reducing a cost or penalty in the optimal data set. Generally, attributes may be identified that indicate what the user values when selecting an optimal data set. The weights 814 of each factor 812 can be set based on the values of the attributes in the client data for each candidate data set 622. Each candidate data set will include individual factors that can be emphasized based on the weights 814 determined from the client data. Then, the weighted combination of factors 812 can be calculated for each of the candidate data sets 622. In some embodiments, any of the candidate data sets 622 that score above a predetermined threshold may be considered optimal data sets. In some embodiments, a predetermined number of the candidate data sets 622 with the highest scores can be determined to be optimal. In some embodiments, the highest scoring candidate data set 622 of each data set type may be determined to be optimal.

FIG. 8 illustrates a single data set considered to be the optimal data set 802. However, other embodiments may identify more than one of the candidate data sets 622 to be optimal as described above. Therefore, the following procedure for the optimal data set 802 may be duplicated for each data set determined to be an optimal data set to be presented to the user on the client device 102.

The optimal data set 802 may include one or more parameters, or values, that are static and unchanging. The optimal data set 802 may also include one or more parameters 804 that can be adjusted by the user. For example, the optimal data set 802 may include unchanging parameters, such as a time interval and/or a designation of whether the value of the rate field is fixed or variable. The optimal data set 802 may also include adjustable parameters, such as an initial cost or penalty. The number and types of unchanging and adjustable parameters 804 in each of the optimal data sets need not be limited. Generally, many of the optimal data sets will include at least a few adjustable parameters 804 that allow the user to tweak the values of the optimal data set 802 to their liking.

In some embodiments, each of the adjustable parameters 804 may be associated with a range of permissible values that includes a discrete set of permissible values. For example, a rate field may have an allowable range of 3.3% to 6.5% with increments of 0.1%. Additionally, some of the adjustable parameters 804 may be linked to other parameters in the optimal data set 802, such that changing the adjustable parameters 804 also cause other parameter values to be changed, even if those linked parameters cannot be adjusted themselves by the user. For example, as a value of a rate field in the optimal data set is increased, a value of a cost or penalty field in the data set may be decreased. Adjustable parameters 804 may also be linked to other parameters that are not adjustable by the user.

By providing the user with the optimal data set 802 with adjustable parameters 804, the user may be allowed to adjust various values in the optimal parameter set 802 to best match their priorities and preferences. However, calculating how a change to an adjustable parameter 804 effects other values in the optimal data set 802 may be a computationally expensive operation, and may require calculations that are specific to the optimal data set 802 that may not be universally applied to all of the available data sets. Therefore, a calculation engine 810 may be included in the system to calculate values for each parameter based on changes to values of adjustable parameters 804. Some embodiments may receive changes to the values of the adjustable parameters from the user at the calculation engine 810, and send back a result set with final values calculated from the adjustments made by the user. This may limit the bandwidth used by the system to transmit various values back and forth between the client device 102 and the cloud system 106. As used herein, the optimal data set 802 represents parameters with unadjustable values and/or adjustable parameters 804 that can be adjusted by the user within permissible ranges. The term "result set" refers to actual values being calculated for each of the parameters in the optimal data set 802. Generally, a result set is sent to the client device 102 for display to the user.

While result sets can be calculated on demand by the calculation engine 810, some users may value seeing an instantaneous response to adjustments made to the parameters displayed on the client device 102. In order to receive an answer from the calculation engine 802, the adjustments made to the parameters would be posted to the cloud system 106, and the new result set generated by the calculation engine 810 would then be sent through the cloud system 106 back to the client device 102. This can result in a long latency between the time when the user makes an adjustment to the adjustable parameter and when the refreshed parameter values in the result set are displayed on the screen of the client device 102.

To solve this and other problems, some embodiments may calculate a plurality of possible result sets 806 for the optimal data set 802. In these embodiments, the calculation engine 810 can calculate values 808 for each parameter in the data set 802 by incrementally adjusting each adjustable parameter 804 through the full range of permissible values for each adjustable parameter 804. In the example stated above, the values in the rate variable can be incremented from 3.3% to 6.5% using increments of 0.1%. For each incremented value of the rate variable, each of the other parameter values in the optimal data set 802 may be calculated by the calculation engine 810, and the resulting result set 806 can be stored. Some embodiments may calculate result sets for each permutation of adjustable parameters 804 in the optimal data set 802, such that every possible adjustment made by the user to the adjustable parameters 804 has a corresponding pre-calculated result set 806.

The processing power and time required to calculate an exhaustive collection of result sets 106 for the optimal data set 802 may be very small compared to the time required to send a request from the client device 102 to the cloud system 106 to retrieve a specific result from the calculation engine 810. Therefore, some embodiments may transmit the full collection of result sets 806 from the website 110 to the client device 102. Thus, when the user makes an adjustment to one or more of the adjustable parameters 804 that are displayed on the client device 102, an instantaneous result can be displayed on the client device, such that values 808 for each parameter can be displayed in real-time to the user as adjustments are made. This allows adjustments to be made by graphical controls, such as slider bars or drop-down controls the mimic analog operation and allow the user to scroll quickly through a range of permissible values for an adjustable parameter 804.

Figure 9:
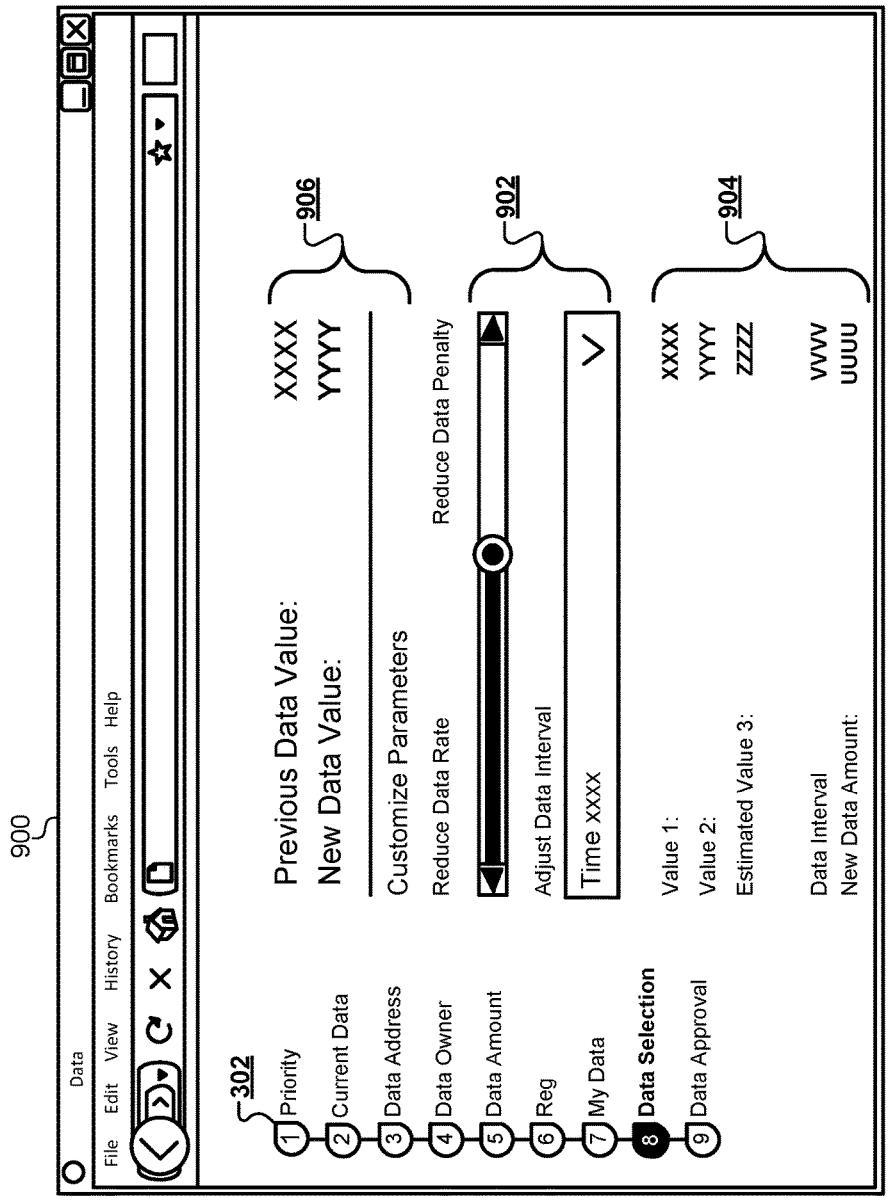
FIG. 9 illustrates a web browser interface that allows a user to make adjustments to adjustable parameters and see live changes to parameter values displayed on the client device, according to some embodiments.

FIG. 9 illustrates a web browser interface 900 that allows a user to make adjustments to adjustable parameters and see live changes to parameter values displayed on the client device 102, according to some embodiments. The interface 900 includes the progress indicator 302 that has been updated to the "Data Selection" stage. The interface 900 also includes a comparison section 906 that compares a particular new data value from the result set to a previous corresponding data value that was provided in the client data by the user. This allows users to immediately evaluate the difference between an existing data value and a new data value calculated in the result set being offered by the cloud system 106.

The interface 900 may also include controls 902 that allow the user to make adjustments to the adjustable parameters in the optimal data set. In the example of FIG. 9, the user can slide the controls 902 back and forth or click on a drop-down menu to see how these adjustments affect the other values in the result set. Some controls may be linked to a plurality of adjustable parameters. For example, the top slider control in interface 900 may link together the value of the rate field and the value of a cost or penalty field. As one of these parameters is increased, the other parameter may decrease accordingly. This allows the user to see the trade-off between two different adjustable parameters that are linked.

As the controls 902 are adjusted, the values in the comparison section 906, along with other values 904 in the result set, can be updated in real-time. Because the full collection of calculated result sets were transmitted to the client device 102, these values can be updated without a return trip to the cloud system 106. In some embodiments, the changes to the display values can be animated such that each incremental change represented by a movement of the controls 102 results in a displayed change to the values. This allows the user to see how quickly the values change in comparison to the rate at which the controls 902 are adjusted. For example, some values may change rather slowly for large movements of the controls 902, while other values may change very quickly. This provides an advantage over simply displaying a set of final results to the changed values after the controls 902 are done being adjusted by the user.

Information displayed on the interface 900 corresponds to a single optimal data set. However, as described above, additional optimal data sets may also be selected for the user. For example, a user may be presented with two or three different optimal data sets, where each optimal data set corresponds to a different data set type. A first optimal data set may correspond to a data set type with a value in the rate field that is fixed and a time interval of X years, while a second optimal data set may correspond to a data set with a value in the rate field that is variable and a time interval of Y years. Although these additional optimal data sets are not displayed in interface 900 due to space constraints, it will be understood that these additional optimal data sets (and the corresponding values in the result sets) may be displayed beneath the information for the optimal data set displayed in interface 900. The user may scroll interface 900 down to see the additional information for the additional optimal data/result sets.

It should be emphasized that this process of taking the client data packet and generating a result set may be completed entirely automatically by the cloud system 106 and/or the data center 138. This process does not need to involve any human interaction. It should be emphasized that previous methods of generating result sets required human interaction with the user. The process described herein may be completely automated such that result sets can be provided to virtually any user entirely through the web interface.

Figure 10:
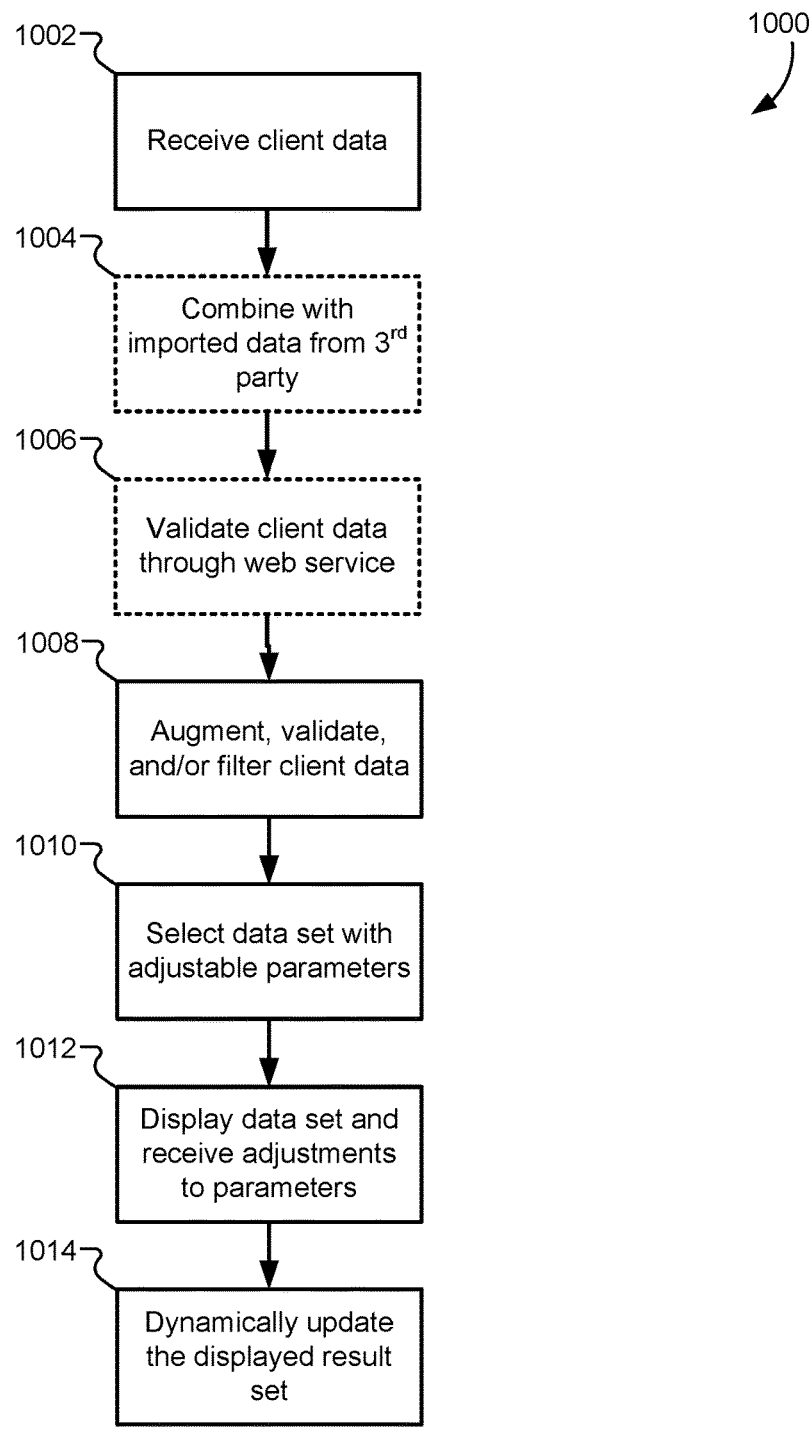
FIG. 10 illustrates a flowchart for a method of collecting data from a client device and generating one or more result sets, according to some embodiments.

FIG. 10 illustrates a flowchart 1000 for a method of collecting data from a client device and generating one or more result sets, according to some embodiments. Flowchart 1000 represents an overall summary of the systems and methods described in detail above in this disclosure. Therefore, any of the steps in the method of flowchart 1000 may include any of the operations described above. The method may include receiving client data from a client device (1002). The method may optionally include combining the client data with data imported from a third-party interface (1004) and validating at least a portion of the client data using a third-party data validation service (1006). The method may additionally include augmenting, validating, and/or filtering the client data to generate a filtered data set for a solution engine (1008). One or more optimal data sets may be selected from a collection of available data sets, where the optimal data sets may include adjustable parameters (1010). As described above, result sets for each optimal data set may be calculated and transmitted to the client device. The optimal data set(s) may be displayed on the client device with values from at least one of the calculated result sets, and adjustments to one or more adjustable parameters may be received from the user (1012). The method may also include dynamically updating the displayed result set to display calculated values corresponding to the adjustments made to the adjustable parameters by the user (1014).

Figure 11:
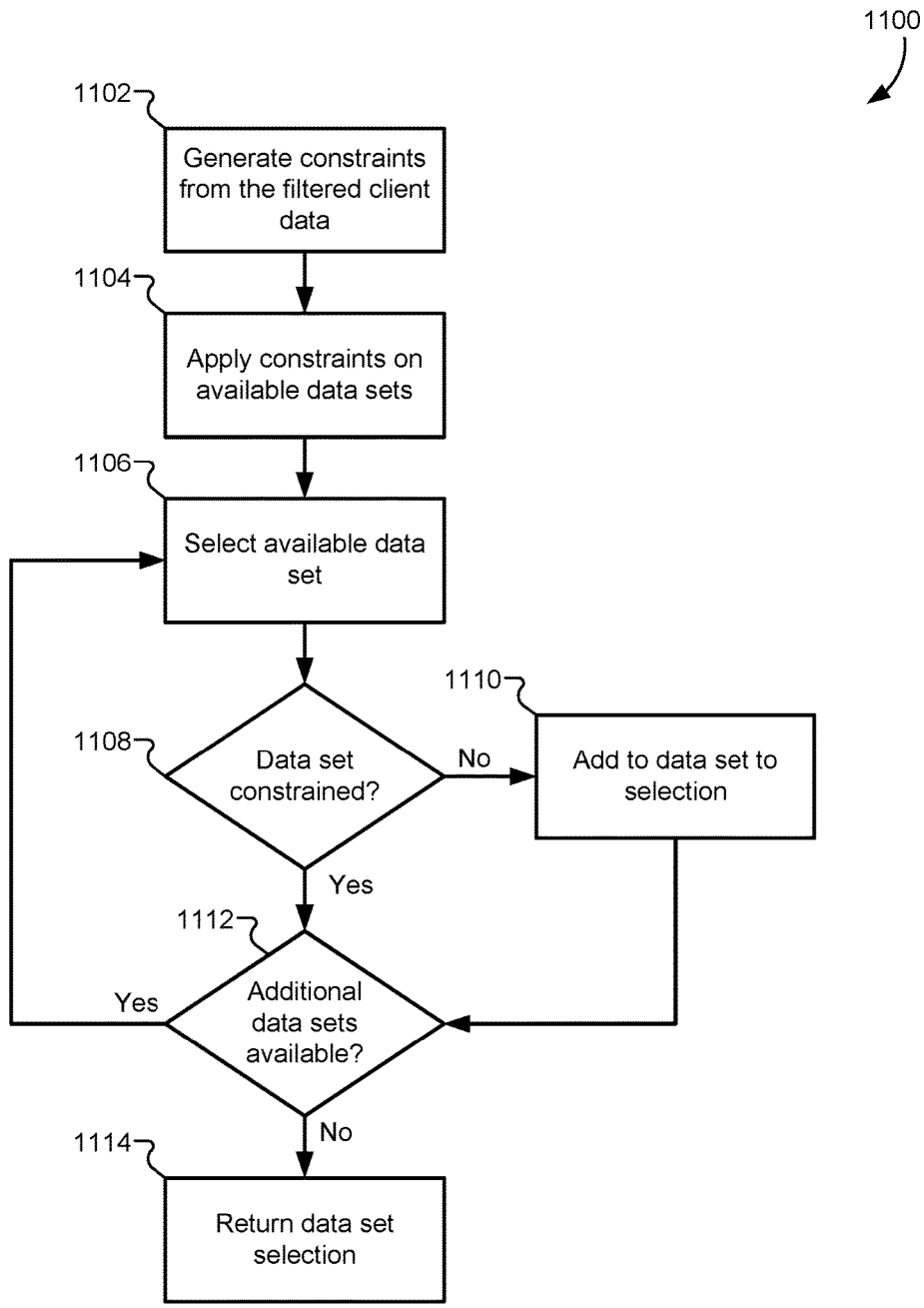
FIG. 11 illustrates a flowchart for a method of selecting candidate data sets from a plurality of available data sets, according to some embodiments.

FIG. 11 illustrates a flowchart 1100 for a method of selecting candidate data sets from a plurality of available data sets, according to some embodiments. Flowchart 1100 represents an overall summary of the systems and methods for selecting candidate data sets described in detail above in this disclosure. Therefore, any of the steps in the method of flowchart 1100 may include any of the operations described above. The method of flowchart 1100 may be executed multiple times during overall process described herein. For example, flowchart 1100 may be executed when selecting candidate data sets from the collection of available data sets. Flowchart 1100 may also be carried out at other points in the process as well.

The method may include generating a plurality of constraints from the filtered client data (1102). These constraints may be built from a plurality of piecewise functions resulting from generated rules. The method may also include applying the constraints to the available data sets (1104). For each available data set (1106), a linear regression algorithm can be used to determine whether that particular data set is constrained (1108). If the current data set is unconstrained, it can be added to a set of candidate data sets (1110). If additional data sets are available in the collection of available data sets (1112), then this process can be repeated for each available data set. The set of candidate data sets can then be returned for selecting an optimal data set from the candidate data sets (1114).

At this stage in the process, the user has provided client data that has been augmented and/or validated by the cloud system 106 and assigned values to the adjustable parameters in a corresponding result set. This result set has been generated in an entirely automated fashion through the web interface of the website 110. At no point in the process has the user had to wait for a human interaction on the other end. This may be significant for many users who are hesitant to provide information when human administrators on the cloud service 106 side have to be involved. Based on empirical research discovered by the inventors, users feel more willing to experiment and see what result sets are available when not required to talk to another person.

Figure 12:
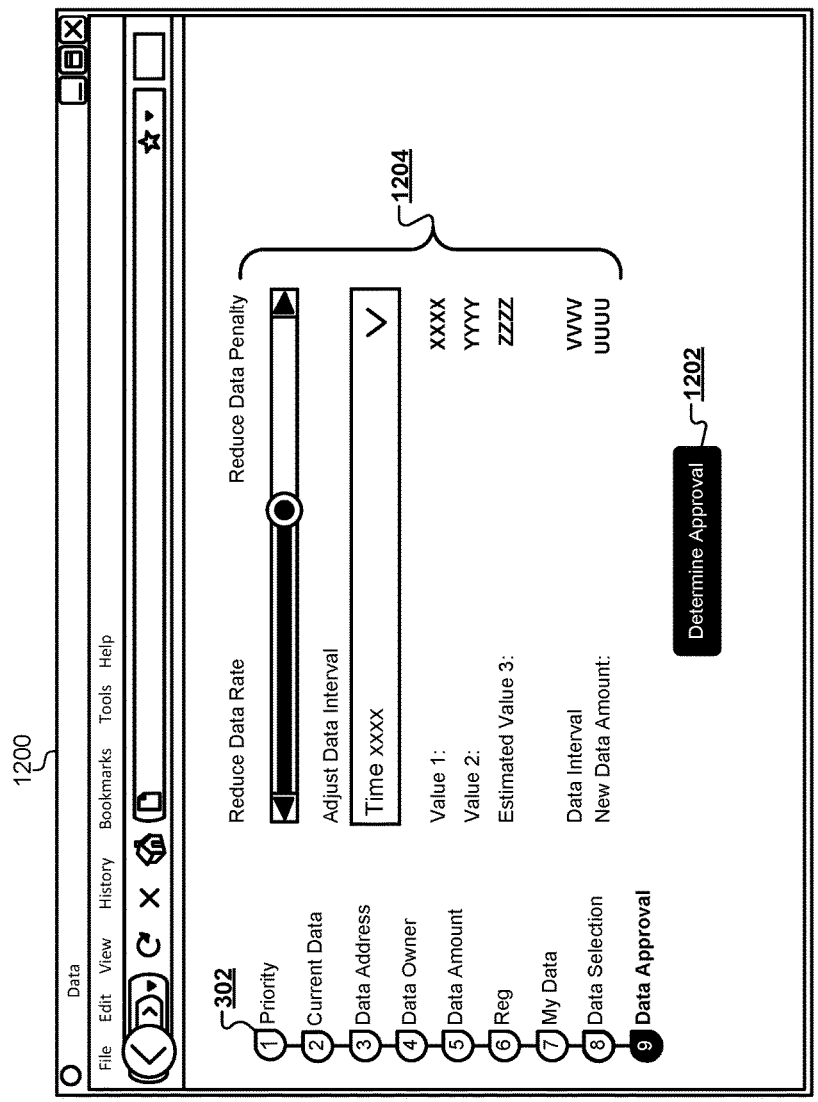
FIG. 12 illustrates a web interface that allows a user to request a qualification or approval of the finalized result set.

After the result set has been finalized by the user, the user may wish to continue the process in a similar automated fashion, without requiring human involvement. FIG. 12 illustrates a web interface 1200 that allows a user to request a qualification or approval of the finalized result set. The web interface 1200 includes the progress indicator 302 that indicates that the current state of the process is the "Data Approval" step. Details of the finalized result set 1204 may be displayed in the top portion of the web interface 1200, and a control 1202 may be provided in the bottom portion of the web interface 1200. The control 1202 may allow the user to automatically request a qualification or approval of the finalized result set displayed in the top portion of the web interface 1200. As was the case with generating and selecting a result set, the process for initiating and receiving a qualification or approval of the finalized result set may also be carried out in a completely automated fashion without requiring human assistance or interference during the process where the user initiates the approval process by clicking the control 402 on the web form 1200.

Figure 13:
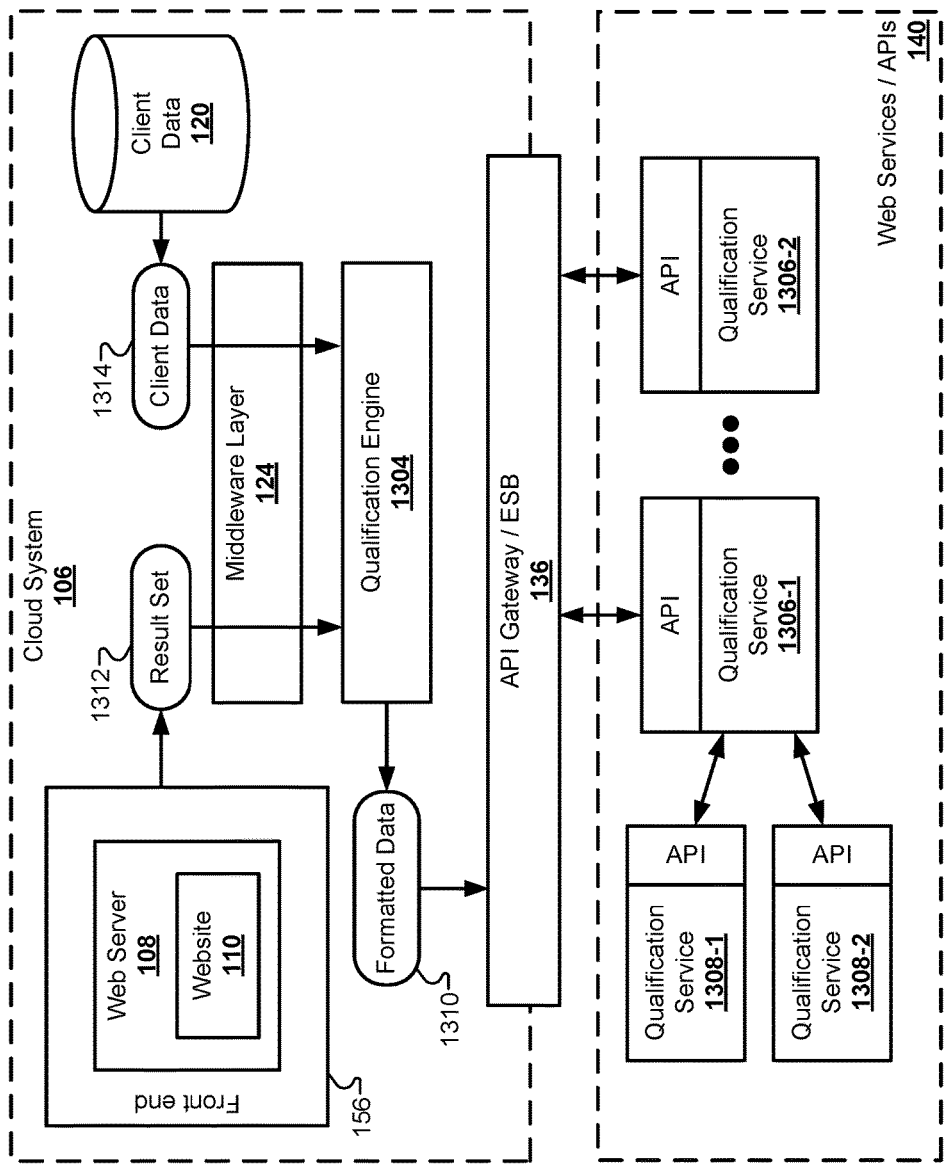
FIG. 13 illustrates a block diagram of the cloud system interacting with a plurality of qualification services, according to some embodiments.

FIG. 13 illustrates a block diagram of the cloud system 106 interacting with a plurality of qualification services 1306, according to some embodiments. After the user has finalized the result set, the finalized result set 1312 can be sent to a universal qualification engine 1304 of the cloud system 106. The finalized result set 1312 may include final values for the adjustable parameters described above, such as a final value for a rate field, a final value for a cost or penalty field, a final value for a time interval field, and so forth. Additionally, the client data that was collected, imported, augmented, and validated during the process described above may be stored in the client data database 120. The client data 1314 may also be provided to the qualification engine 1304.

After receiving the finalized rule set 1312 and the client data 1314, the qualification engine 1304 can filter and/or combine data fields from the finalized result set 1312 and the client data 1314 to put together specific data packages that are required by each of the qualification services 1306. Each qualification service 1306 may require certain data points from the finalized result set 1312 and/or the client data 1314, and the qualification engine 1304 can assemble data packages that match the requirements of each particular qualification service 1306. Additionally, each qualification service 1306 may require that each data packet be formatted according to specific requirements, such as a specific XML, file format. The qualification engine 1304 can format each data package according to the requirements of each particular qualification service 1306.

Through the API Gateway/ESB 136, the qualification engine 1304 can send data packages to one or more of a plurality of qualification services 1306. Some qualification services 1306 may be communicated with directly by the cloud system through a corresponding public API or web service interface. Secondary qualification services 1308 may be accessible through another qualification service 1306-1. In these cases, the data package can be formatted and selected based on the requirements of the qualification service 1306-1, and a field or designator may be provided indicating that the qualification service 1306-1 should send the request to a specific secondary qualification service, such as qualification service 1308-2.

In some cases, each qualification service 1306 may impose a penalty or cost on each submitted request. Therefore, it may be advantageous for the cloud system 106 to intelligently determine an order of precedence or ranking for the qualification services 1306. When a plurality of qualification services are available, the cloud system 106 can rank each of the qualification services based on the criteria discussed below, then sequentially send requests to each of the qualification services 1306 until an acceptable result has been returned. In some embodiments, the request may be sent simultaneously to each of the qualification services 1306 without regard for a specific penalty for each. Instead, the system can analyze the results from each of the qualification services 1306 to determine which of the results is most advantageous. These embodiments will be discussed in greater detail below.

Figure 14:
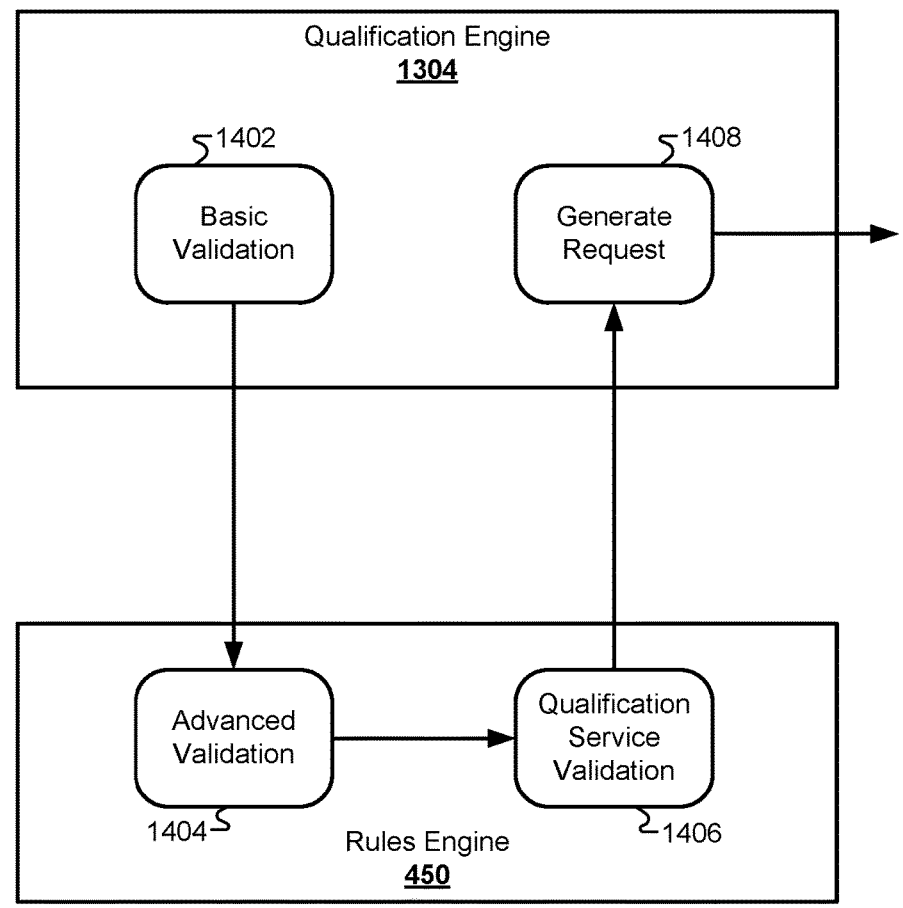
FIG. 14 illustrates a flow diagram of a hierarchy of data validation processes that may be performed on a data packet generated by the qualification engine prior to sending the data packet to the qualification services for approval, according to some embodiments.

FIG. 14 illustrates a flow diagram of a hierarchy of data validation processes that may be performed on a data packet generated by the qualification engine 1304 prior to sending the data packet to the qualification services 1306 for approval, according to some embodiments. At the qualification engine 1304, a basic validation process 1402 may be executed. The basic validation process may ensure that basic values are included for each field in the data packet to be transmitted to the qualification service. The basic validation process 1402 can be used to ensure that the basic requirements of the qualification service are met. If the basic validation process 1402 fails, then it is likely that the qualification service may return an error if the data packet were submitted to the qualification service without first remedying the error. In some embodiments, the basic validation process 1402 may use validation rules that are hardcoded into the qualification engine 1304.

If the data packet passes the basic validation process 1402, the data packet can be sent to the rules engine 450 for an advanced validation process 1404. The advanced validation process 1404 may use dynamic rules that are available to the rules engine 450 to perform a higher level of validation checks on the data packet. These validation checks may include determining whether an address in the data packet is valid, determining whether the finalized result set 1312 corresponds to a valid rule set that can be approved by the qualification services, and so forth. In comparison to the basic validation process 1402 in the qualification engine 1304, the advanced validation process 1404 in the rules engine 450 can be dynamically updated with new rules as they may be developed to meet the changing standards and/or requirements of the various qualification services.

If the data packet also passes the advanced validation process 1404, the rules engine 450 can execute a qualification service validation process 1406 to determine whether a specific qualification service is required based on the finalized result set 1312. Some finalized rule sets may correspond to a specific type of rule set that is only qualified or approved by a specific one of the plurality of qualification services 1306 (e.g., a specific one of the plurality of qualification services 1306 administers the particular type of the finalized result set). The qualification service validation process 1406 can determine which qualification service a particular finalized result set 1312 may be required to use. Note that in some cases, the finalized result set 1312 may be agnostic to the qualification services 1306, such that any of the qualification services 1306 may be used.

Figure 15:
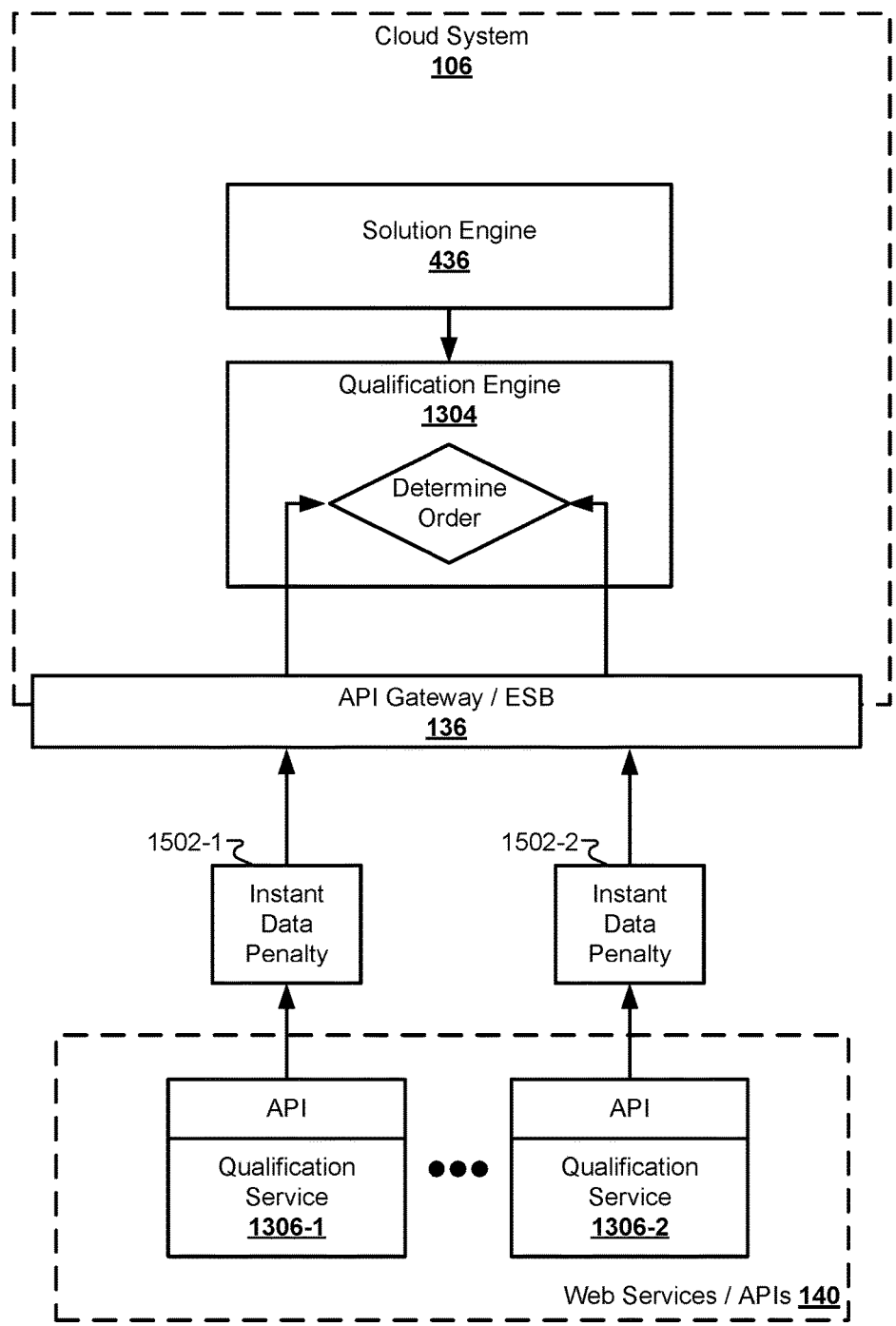
FIG. 15 illustrates a block diagram of systems for ranking qualification services, according to some embodiments.

After completing the qualification service validation process 1406, the data packet can be passed back to the qualification engine 1304, which can generate a request 1408 for a ranking of qualification services 1306 to be developed for this particular data packet. FIG. 15 illustrates a block diagram of systems for ranking qualification services 1306, according to some embodiments. Each qualification service 1306 may be associated with variable penalties or costs for each particular type of finalized result set sent for approval. For example, qualification service 1306-1 may have less-stringent requirements for qualification or approval, but may also include a higher penalty or cost for using the qualification service 1306-1. In contrast, qualification service 1306-2 may have more-stringent requirements for qualification for approval, but may have a lower penalty or cost for using the qualification service 1306-2.

These requirements and/or penalties and costs may change rather frequently depending on circumstances. In some cases, these values may change on a daily basis. In other circumstances, these values may change on an hourly basis. The qualification engine 1304 may be configured to select the best qualification service 1306 for the user. Therefore, the solution engine 436 may download instant information 1502 that describes the qualification requirements and/or penalties that may be associated with each qualification service 1306. In some embodiments, the information 1502 may be downloaded on a daily basis. In some embodiments, the information 1502 may be downloaded more or less frequently than a daily basis. The solution engine 436 can store and/or update the information 1502 for each of the corresponding qualification services 1306. In some cases, the information 1502 can be downloaded directly from the qualification services 1306, while in other cases the information 1502 can be downloaded from other external services.

When the qualification engine 1304 receives a response from the rules engine 450 to rank the qualification services 1306, the qualification engine 1304 can receive a request to provide the requirement and/or penalty and cost information for each of the qualification services. In some embodiments, the qualification engine 1304 can rank qualification services 1306 based on the penalties and/or costs that would be applied to the finalized result set 1312 selected by the user. In cases where the penalty and cost information for one or more of the qualification services 1306 is the same, a default ranking of qualification services 1306 can be previously established and used based on historical penalty and/or cost information related to each of the qualification services 1306. This may result in a default qualification service ranking that has historically provided the smallest penalty and/or costs. In some embodiments, the default ranking may be based on which of the qualification services 1306 is able to qualify the largest number of finalized result set types.

Once a ranking is been established for the qualification services, the qualification engine 1304 can send the validated data packet to a first qualification service 1306-1. As will be discussed in greater detail below, the first qualification service 1306-1 can send a response to the data packet that indicates the degree to which the finalized result set can be approved by the qualification service. When the first qualification service 1306-1 indicates that the finalized result set 1312 has been approved, no further action may need to be taken by the qualification engine 1304. Conversely, when the first qualification service 1306-1 indicates that the finalized result set 1312 has not been approved, then the qualification engine 1304 can move to the next qualification service 1306-2 in the ranking established above. This process can be repeated, "waterfalling" from one qualification service to the next until the finalized result set 1312 has been approved or fully denied.

As discussed above, some finalized result sets 1312 may be specifically designed for a particular subset of the qualification services 1306. In these cases, the ranking of the qualification services 1306 may be preserved within that subset. In a base case, the finalized result set 1312 may be designed for a specific one of the qualification services 1306. Here, the qualification engine 1304 can receive an indication from the solution engine 436 that the finalized result set 1312 is only compatible with a single qualification service 1306, and the qualification engine 1304 can forgo ranking the other qualification services for this particular finalized result set 1312.

Figure 16:
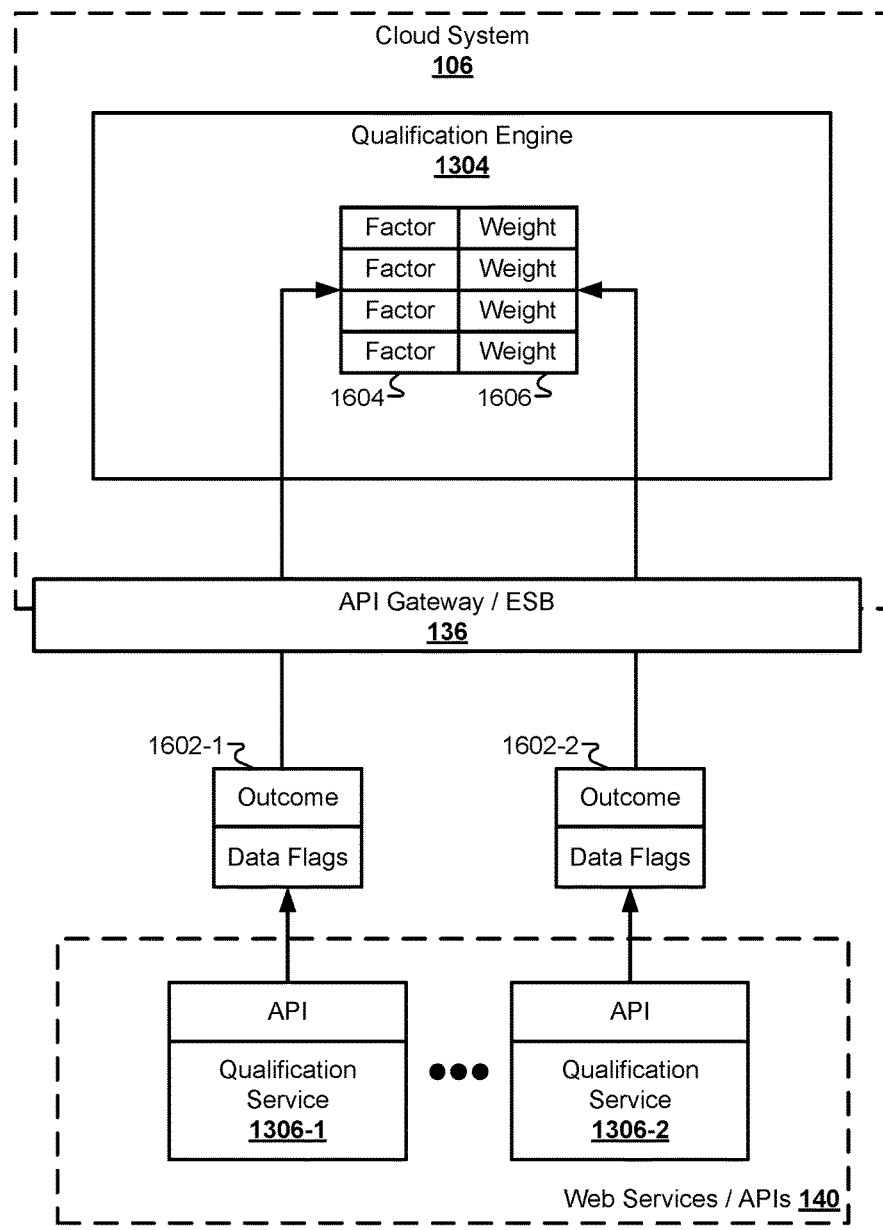
FIG. 16 illustrates a block diagram of a system for comparing results from the plurality of qualification services, according to some embodiments.

FIG. 16 illustrates a block diagram of a system for comparing results from the plurality of qualification services 1306, according to some embodiments. Once the data packet for a finalized result set is submitted to a qualification service 1306, the qualification service 1306 can return an outcome 1602 that indicates a degree to which the data packet was qualified or approved. In some embodiments, the outcome 1602 may include one or more data flags or "findings" that provide additional details regarding the qualification process and why that particular outcome was reached. As described above, if the outcome is acceptable for a first qualification service, then data packets do not need to be sent to additional qualification services according to some embodiments.

However, in some embodiments, additional data packets may be sent to qualification services even if the first qualification service provides a positive outcome indicating that the corresponding data packet was qualified or approved. For example, some embodiments may send data packets to each available qualification service 1306 and receive corresponding outcomes 1602 from each available qualification service 1306. Instead of ranking the various qualification services 1306 to determine which qualification service should be used, these embodiments may initially send a data packet to every qualification service, wait for a response, and then determine which qualification should be used going forward for the finalized result set 1312.

One benefit of waiting to decide which qualification service 1306 to use going forward until after receiving a plurality of outcomes 1602 involves matching some of the findings in the outcomes 1602 with corresponding attributes in the client data used to generate the data packets. As described above in relation to selecting an optimal data set, attributes may be determined for various data fields in the client data. These attributes may indicate criteria that are important to the user in not only selecting an optimal data set, but also in selecting a qualification service. For example, some users may have an attribute that favors a longer time interval associated with the finalized result set 1312. Another attribute may indicate a preference to minimize a number of tasks to be performed by the user. As was the case for selecting the optimized data set, each of these attributes can be correlated with a particular factor 1604 (or finding) in the outcomes 1602 from the qualification services 1306. The values for each of the corresponding attributes in the client data can be used to generate weights 1606 that can be applied to each of the factors 1604. The weighted combination of factors for each outcome 1602 can be calculated to determine a score for each outcome 1602 in addition to an approval designation. For each approved outcome 1602, the score from the weighted combination of factors can be used to rank or select a qualification service 1306 going forward.

By using the weighted combination of factors described above, a user can further customize not only the finalized result set itself, but also the way the finalized result set is processed in the future. For example, some qualification services may offer to remove a requirement to perform certain tasks from a future list of required tasks, such as providing documentation for data values asserted by the user in the client data. Some qualification services may agree to certain values for time interval fields in the finalized data set that are longer or shorter than a standard time interval value. These types of benefits for use in qualification service 1306 may not be available or apparent before the data packet is submitted to the qualification service 1306. Therefore, submitting data packets to each of the qualification services 1306 and correlating attributes in the client data to factors in the outcomes 1602 can provide a better ranking of qualification services 1306 to be used in the long run.

Figure 17:
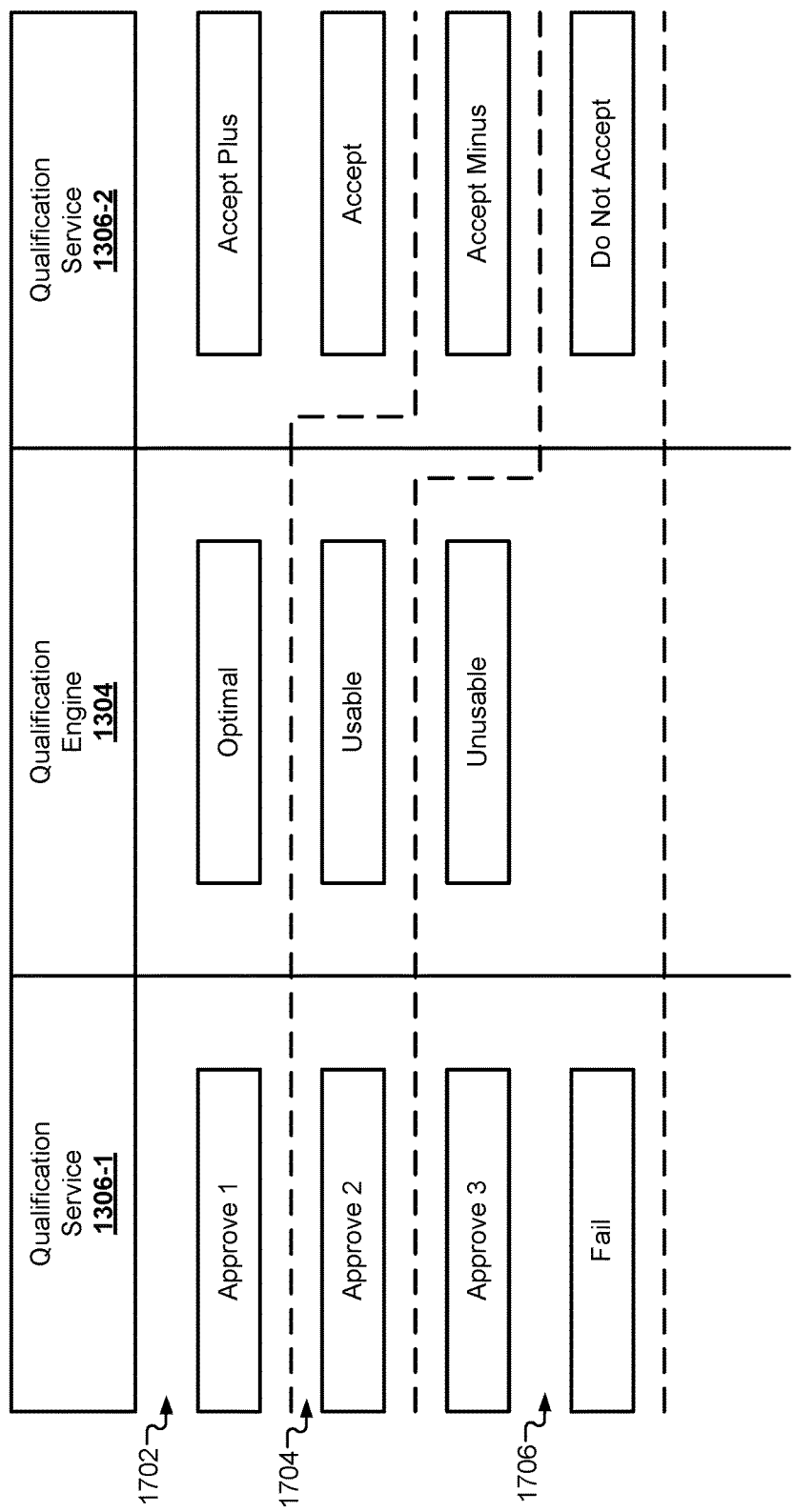
FIG. 17 illustrates how to determine whether a received qualification service outcome is optimal or usable, according to some embodiments.

FIG. 17 illustrates how to determine whether a received qualification service outcome is optimal or usable, according to some embodiments. In the cases described above, it was assumed that qualification services either approved or did not approve the finalized data set represented by the submitted data packets. However, some qualification services may provide more nuanced outcomes that need to be normalized and handled by the qualification engine 3004. For example, the first qualification service 1306-1 may offer at least four different levels of outcomes illustrated in FIG. 17. Similarly, qualification service 1306-2 may offer four different levels of outcomes. The qualification engine 1304 may be configured to harmonize these outcomes to a standardized set of outcomes that can be compared equally across different qualification services.

For example, the qualification engine 1304 may consider standardized outcomes, such as optimal, usable, and unusable outcomes as illustrated in FIG. 17. By normalizing the outcomes from the various qualification services 1306, each of the possible outcomes for each qualification service 1306 can be categorized according to these three levels. Qualification service 1306-1 may have its highest outcome classified as an optimal outcome 1702, while qualification service 1306-2 may have its two highest outcomes classified as optimal outcomes 1702. The next highest outcomes for both qualification service 1306-1 and qualification service 1306-2 may be classified as usable outcomes 1704. The two lowest outcomes for qualification service 1306-1 may be classified as unusable outcomes 1706, along with the lowest outcome of qualification service 1306-2.

The various outcomes and classifications in FIG. 17 are provided merely by way of example, and are not meant to be limiting. These outcomes need not correspond to any real-world outcomes provided by real-world qualification services. It will be understood that various qualification services may provide many different outcome levels, and these levels can be normalized to fit within the outcome levels specified by the qualification engine 3004 such that each of the qualification services may be compared equally while providing their own individualized outcome levels.

In some embodiments, the normalized level of the outcomes can be used to rank and select a qualification engine 1306 when more than one acceptable outcome is generated from the plurality of qualification services 1306. When multiple outcomes are classified as optimal, these qualification services 1306 may be ranked according to the weighted combination of factors described above, and/or the penalty/cost described above. However, optimal outcomes will generally be ranked higher than usable outcomes, and unusable outcomes may be disqualified altogether.

Figure 18:
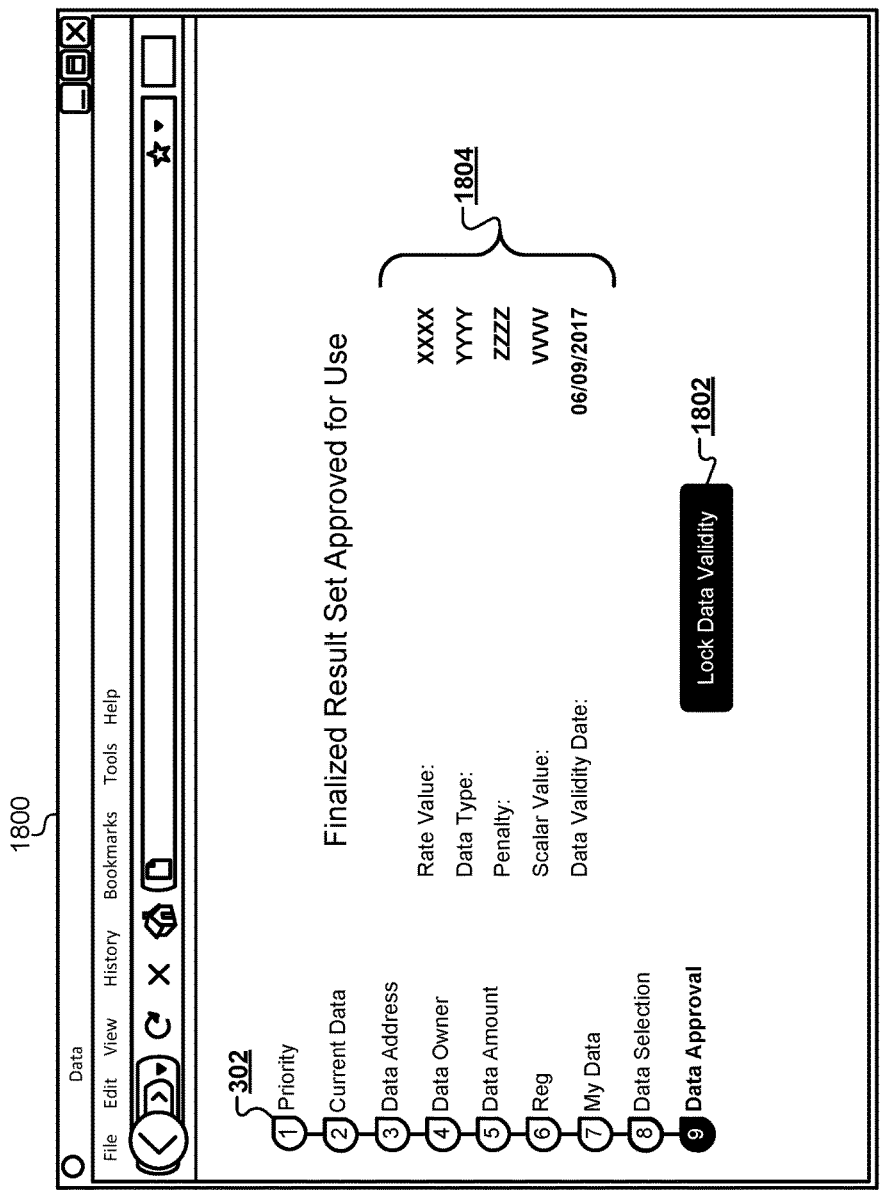
FIG. 18 illustrates a browser interface for indicating approval of a finalized result set and locking data validity for a time interval, according to some embodiments.

After the finalized result set 1312 has been qualified by at least one of the qualification services 1306, the user interface of the client device 102 can display an indication that the finalized result set is approved for use moving forward. FIG. 18 illustrates a browser interface 1800 for indicating approval of a finalized result set and locking data validity for a time interval, according to some embodiments. The browser interface 1800 may display final values 1804 for the finalized result set 1312 for the user.

At this point, the client data has been collected, imported, augmented, and/or validated; and an optimal data set has been selected from a plurality of candidate data sets. The client device 102 has been provided a finalized result set of values for any adjustable parameters in the optimized data set, and the finalized result set 1312 has been qualified. In other words, the finalized result set 1312 may be ready for use in additional processes/transactions going forward for the user. Many data qualification services and algorithms may be time dependent, such that the qualification status is only valid for a predetermined time interval. Data validity implies that the user can use the finalized result set in other operations moving forward such that the system guarantees that the data will remain valid until one or more events occur. The browser interface 1800 includes a data validity expiration date in the display final values 1804. As described below, this date represents a time when a set of required inputs must be received, otherwise the data can no longer be guaranteed to be valid by the system through the rest of the data validity interval. If the validity of the data expires, the user may have to submit a new finalized result set for re-qualification.

The browser interface 1800 includes a control 1802 that allows the user to lock the data validity of the finalized result set 1312. By selecting the control 1802, the user can initiate a lock process that internally instructs the system to lock the validity of the finalized result set 1312, and to provide additional data that may be required for the finalized result set 1312 to be used in the future. It should be emphasized, that this entire process, including the ability to lock the data validity may be performed in an automated fashion through the browser interface 1800 without any system-side human intervention. Thus, the data validity lock procedure will be driven entirely by the client device 102 and the inputs of the user of the client device 102.

Figure 19:
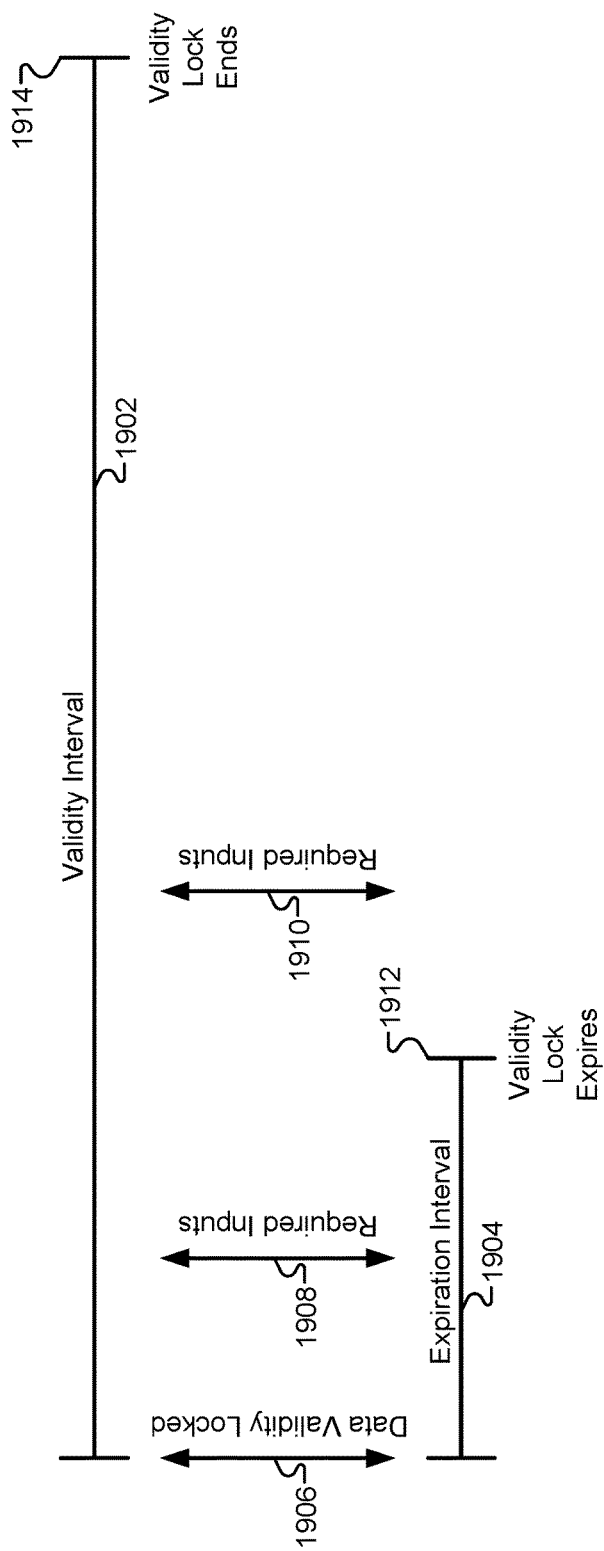
FIG. 19 illustrates a validity interval and an expiration interval that may be applied to the finalized result set, according to some embodiments.

FIG. 19 illustrates a validity interval 1902 and an expiration interval 1904 that may be applied to the finalized result set 1312, according to some embodiments. The data validity interval, or validity interval 1902, represents the maximum time that the data validity will be guaranteed by the system. The validity interval may be any time interval, such as 10 days, 15 days, 20 days, 30 days, 40 days, 45 days, 60 days, 90 days, and so forth. The validity interval 1902 may be initiated at a time 1906 when the data validity is locked, for example, using the control 1802 in the browser interface 1800. Thus, the data can be assumed to be valid beginning at time 1906 when the validity is locked, and ending at time 1914 when the validity interval 1902 ends. The length of the validity interval 1902 may be determined automatically by the system based on a number of different factors, which will be described in greater detail below in relation to FIG. 20.

In addition to the validity interval 1902, the validity of the finalized result set 1312 may also be affected by a second time interval, referred to herein as a data expiration interval, or expiration interval 1904. Guaranteeing the validity of the finalized result set 1312 may consume memory and system resources or may include other penalties for the user and/or the system. Therefore, it may be advantageous to determine whether the user intends to utilize the finalized result set 1312 before the end of the validity interval 1902. This may be particularly true with a client-device-driven interface described herein where the user is able to lock the validity of the finalized result set 1312 without any human intervention. While such a system entices users to complete the process, it may also result in many users finalizing result sets that are never used. The expiration interval 1904 allows the system to expire the validity of the finalized result set 1312 prior to the end of the validity interval 1902 when sufficient action by the user is not taken by the end of the expiration interval 1904.

The expiration interval 1904 may be initiated and begin at the time 1906 when the data validity is locked via the control 1802 in the browser interface 1800. In some embodiments, the expiration interval 1904 and the validity interval 1902 may begin at the same time and run concurrently. The expiration interval may be any time that is shorter than the validity interval 1902, such as 5 days, 8 days, 10 days, 14 days, 20 days, and so forth.

In order to prevent the automatic expiration of the data validity at time 1912 at the end of the expiration interval 1904, the system may require the client device 102 to submit one or more required inputs. These required inputs may be derived from the client data and/or the data that is returned from the qualification services 1306. Each individual finalized result set 1312 may have a corresponding individualized set of required inputs assembled when the data validity is locked at or before time 1906. The required inputs need not be submitted simultaneously, but may instead be submitted to the system incrementally as they become available or are completed by the user of the client device 102.

There are at least two cases to consider when determining whether to automatically expire the validity of the finalized result set 1312 prior to the end of the validity interval 1902. In the first case, all the required inputs may be received at a time 1908 within the expiration interval 1904 prior to time 1912. In this case, the validity of the data can be locked throughout the remainder of the validity interval 1902 without requiring additional required inputs from the client device. In a second case, the required inputs may not be received until time 1910, which is after time 1912. In this case, the validity of the data can automatically expire at time 1912 because the required inputs were not received by the system on time.

In some embodiments, the expiration interval 1904 can begin with a relatively short duration (e.g., 8 days). However, if any of the required inputs are received during the expiration interval 1904, the duration of the expiration interval 1904 can be lengthened past time 1912. Receiving any inputs may indicate that the user intends to use the finalized result set 1312 and may be working to provide the remainder of the required inputs. In some embodiments, the length by which the expiration interval 1904 is increased may depend on a relative importance of the required inputs received thus far and/or the number of the required inputs received thus far. In some embodiments, each incremental submission of a portion of the required inputs may increase the length of the expiration interval 1904 proportionally.

In some embodiments, as time 1912 draws near at the end of the expiration interval 1904, the system may be automatically configured to send alerts to the client device 102 indicating that the expiration interval 1904 is progressing towards expiration. These alerts may comprise emails, text messages, SMS messages, voicemails, instant messages, and/or the like. In some embodiments, after each one of the required inputs is received, an alert may be sent to the client device 102 indicating required inputs that have been successfully submitted, along with any required inputs still need to be submitted.

Some embodiments may also include a manual expiration function that allows an administrator of the cloud system 106 to manually expire the validity of the data. This operation may be performed even after time 1912, and may be performed even after all of the required inputs have been received. This option allows a human administrator to intervene in what would otherwise be a fully automated process if it is determined that the data should no longer be guaranteed is valid for any reason.

Figure 20:
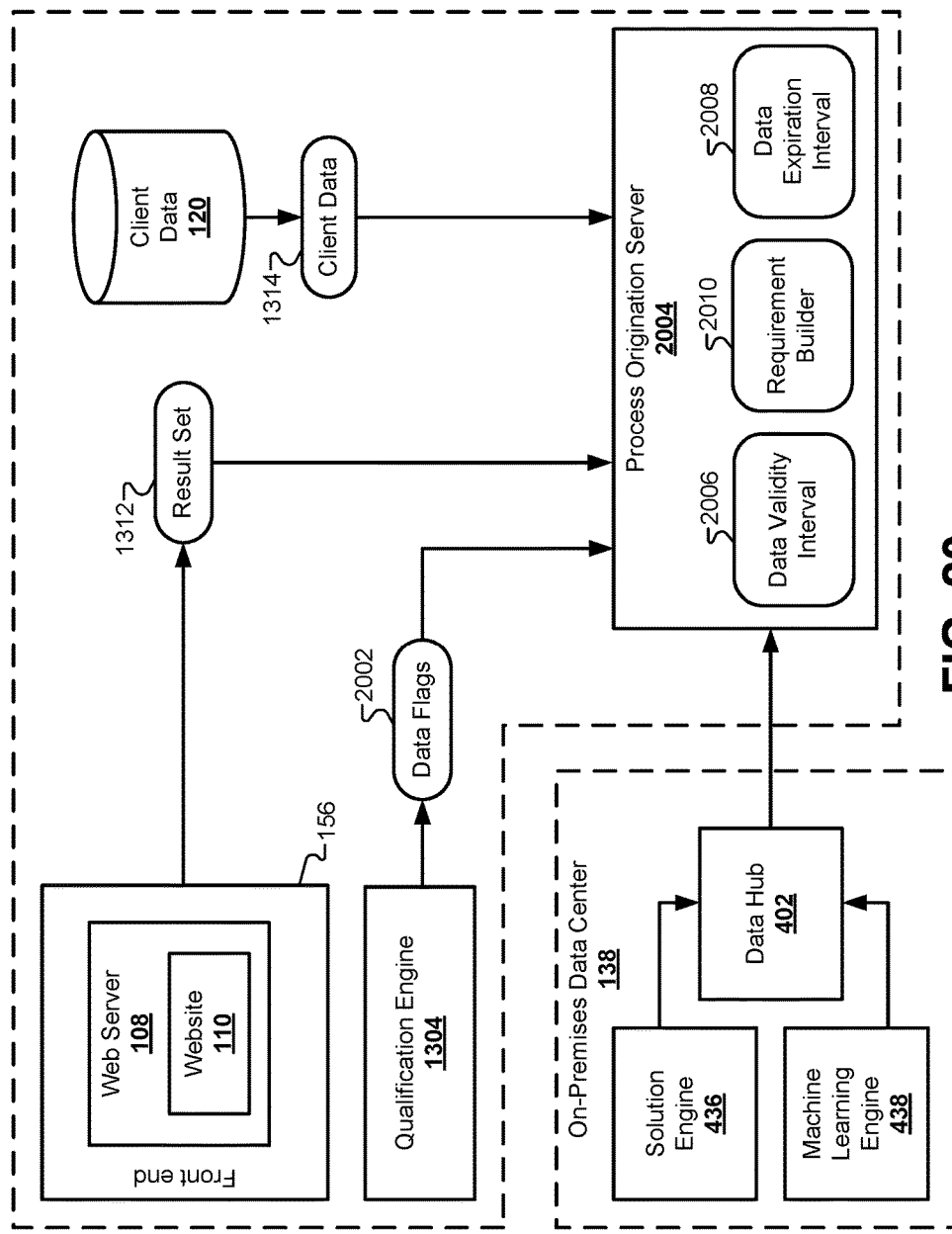
FIG. 20 illustrates a block diagram of the different system components that contribute to locking the finalized result set as valid data, according to some embodiments.

FIG. 20 illustrates a block diagram of the different system components that contribute to locking the finalized result set 1312 as valid data, according to some embodiments. A process origination server 2004 may reside either in the cloud system 106 or in the on-premises data center 138. This particular configuration illustrates the process origination server 2004 in the cloud system 106. The process origination server may be configured to orchestrate a process by which the user can make use of the finalized result set 1312 to complete other processes and transactions. For example, the process origination server 2004 may automatically generate one or more documents that may be required for the user to complete other processes. The process origination server 2004 may collect the required inputs submitted during the expiration interval 1904. The process origination server 2004 may also interface with other third-party systems to import additional data and/or validate additional data submitted as part of an ongoing process that uses the finalized result set during the validity interval 1902.

The process origination server 2004 may include a data validity interval process 2006 that manages the data validity interval 1902. The data validity interval process 2006 may determine an initial length of the data validity interval 1902. The length of the data validity interval may be influenced by a number of factors from a number of different components in the system. In some embodiments, the data validity interval may be influenced by the client data 1314. For example, the client data 1314 may include a user preference indicating a desired length of the data validity interval 1902.

In some embodiments, the data validity interval 1902 may be influenced by the finalized result set 1312. Generally, the finalized result set 1312 may include a field that represents the length of the data validity interval 1902. One of the adjustable parameters of the optimized data set may represent the length of the data validity interval 1902. The user may adjust the desired length of the data validity interval 1902, and the adjustment may be submitted as part of the finalized result set for qualification from the qualification services 1306. If qualified by the qualification services 1306, then the data validity interval 1902 in the finalized result set 1312 may be used as the data validity interval in FIG. 19.

In some embodiments, the data validity interval 1902 may be influenced by the result received by the qualification engine 1304. Recall above that the qualification services 1306 may return both an outcome and a plurality of data flags 2002. The plurality of data flags 2002 may include options that may be offered to the client device 102 that may adjust either the length of the data validity interval 1902 and/or the set of required inputs expected during the data expiration interval 1904. For example, the data flags 2002 may indicate that the length of the data validity interval 1902 may be shortened (e.g. 10 days, 15 days, etc.) from an original data validity interval length submitted with the finalized result set. This may be particularly true if the client data 1314 indicates a user preference for a shorter data validity interval 1902 if such a result was approved by the qualification services 1306.

In some embodiments, the data validity interval 1902 may also be influenced by calculations performed by the data hub 402. The data validity interval 1902 may be one of the components of each of the available data sets that are constrained and evaluated by the solution engine 436. For example, some of the available data sets may require data validity intervals of specified lengths. Thus, when the user selects between one or more of the optimized data sets, this selection may influence the final length of the data validity interval 1902.

The process origination server 2004 may also include a data expiration interval process 2008 that can calculate and monitor the length and progress made during the data expiration interval 1904. Like the length of the data validity interval 1902, the length of the data expiration interval 1904 may be determined by a number of different factors. In some embodiments, the length of the data expiration interval 1904 may be set to a default value (e.g. 8 days). In some embodiments, this default value may be overridden or influenced by other factors. In one example, client data 1314 that has been imported and/or validated by a third-party import and/or validation service may increase or decrease the length of the data expiration interval 1904. The data flags 2002 returned from the qualification engine 1304 may specifically indicate that the data imported and/or validated have been accepted by the qualification services 1306, and may thus also influence the length of the data expiration interval 2008.

Other values in the client data 1314 may also influence the length of the data expiration interval 1904. For example, a rating of the user received from a third-party rating service may be determined to be above a predetermined threshold. This determination may increase the length of the data expiration interval 1904. In another example, a location code in the client data 1304 may indicate a location that requires a longer or shorter data validity interval 1902 and/or data expiration interval 1904. This may be particularly true for locations that require external processes that take more time than is usual to complete. These external processes may contribute to the required inputs that need to be received during the data expiration interval 1904, and thus the data expiration interval 1904 may be lengthened accordingly. Generally, any data in the client data 1314 and/or other data in the system that indicates that the client data 1314 is more/less reliable may influence the length of the data expiration interval 1904.

The process origination server 2004 may also include a requirement builder 2010. The requirement builder may be configured to construct a customized set of required inputs that need to be received during the data expiration interval 1904 to prevent automatic expiration of the locked data. In some embodiments, the set of required inputs may include documentation (e.g., PDFs, emails, verifications, etc.) that must be submitted from the client device 102 to the process origination server 2004. A baseline set of required inputs may be applied to each finalized result set 1312 unless other factors cause the required inputs to change. In some embodiments, the set of required inputs may be determined by the optimal data set returned by the data hub 402, such that each of the available data sets is associated with a corresponding set of required inputs.

In some embodiments, the set of required inputs may be determined by the data flags 2002 return from the qualification engine 1304. The data flags 2002 may include one or more flags that indicate required inputs that may be required by the qualification services 1306. In some embodiments, the set of required inputs may be reduced and/or increased based on the data flags 2002. For example, the data flags 2002 may indicate that at least a portion of the client data 1314 has been imported and/or validated by third-party import and/or validation services. The qualification services 1306 may accept the imported and/or validated client data without requiring any additional inputs associated therewith. Therefore, the data flags 2002 may eliminate some documentation or other inputs that may otherwise be required during the data expiration interval 2008. The set of required inputs may also be influenced by the location code in the client data 1314, some of the data values in the client data 1314, and/or the data set received from the data hub 402. For example, the optimal data set received from the data 402 may be associated with a corresponding set of required inputs.

Figure 21:
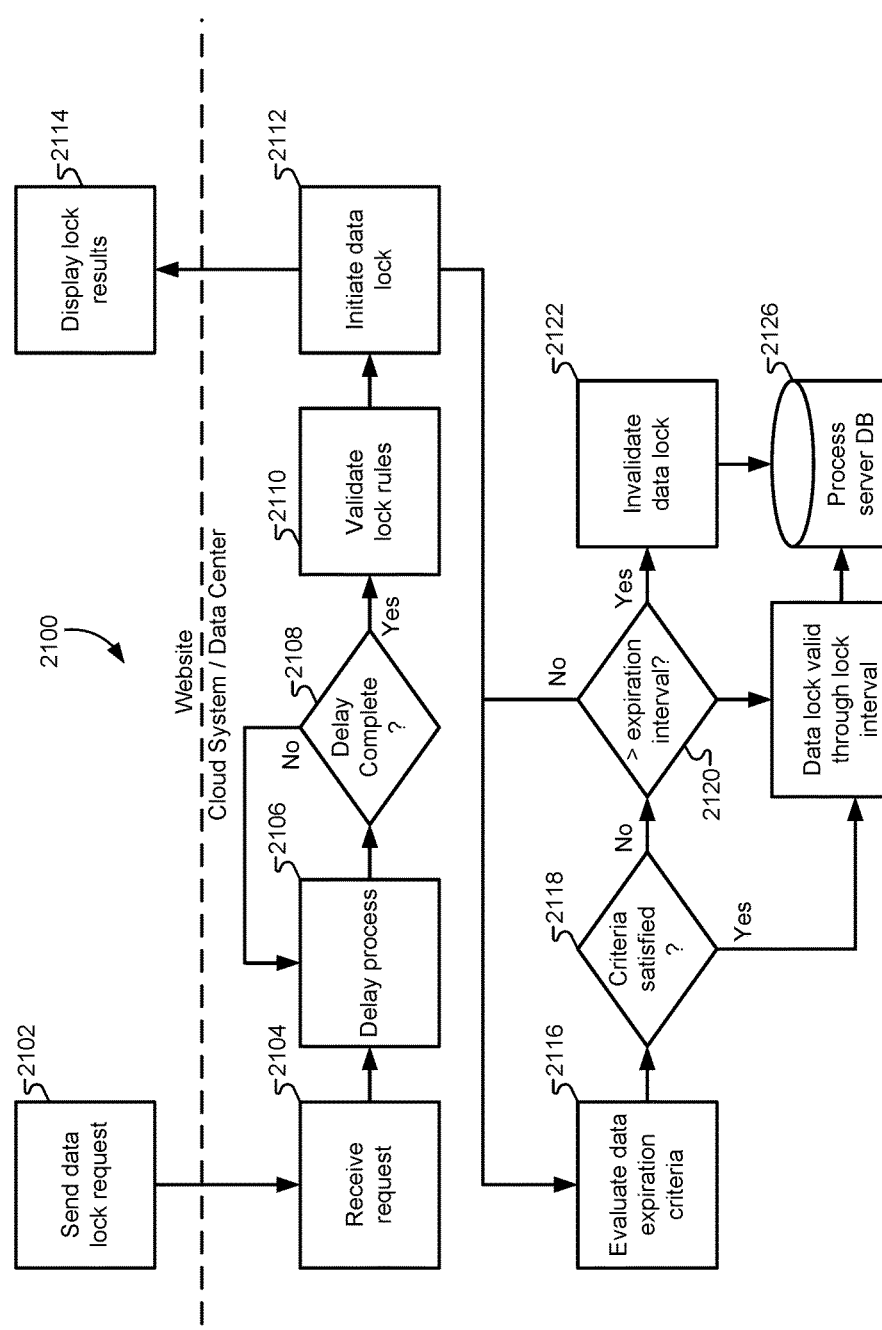
FIG. 21 illustrates a flowchart of a method for executing a data expiration interval, according to some embodiments.

FIG. 21 illustrates a flowchart 2100 of a method for executing a data expiration interval, according to some embodiments. Flowchart 2100 presents a framework for the embodiments described above for locking the validity of the finalized result set 1312. Therefore, any of the details described above may be included in flowchart 2100 in any combination and without limitation. The method may include sending a data lock request (2102). This request may be sent from the website to the process origination server 2004. Consequently, the process origination server 2004 may receive the lock data request (2104) from the website.

The method may additionally include initiating a delay process (2106). The delay process may insert a delay between a time when the data lock interval is requested by the website and a time when the data lock goes into effect. The delay process may be required to allow other calculations or processes to complete that may be required for the finalized result set to be guaranteed as valid during the data validity interval 1902. When the delay is complete (2108), the finalize result set 1312, the client data 1314, the data flags 2002, and/or any additional data required by the process origination server 2004 may undergoing a final validation check (2110). In some embodiments, the lock rules that are validated may be moved earlier in the process, such as prior to the finalized result set 1312 being sent to the qualification services 1306. This ensures that the finalized results will qualify for the data lock before the finalized result set 1312 is qualified by the qualification services 1306.

The method may additionally include initiating the data lock (2112). This may begin the data validation interval 1902 and/or the data expiration interval 1904. An indication may be sent to the website to be displayed on the client device 102 indicating that the data lock was successful (2114). During the data expiration interval 1904, the method may include evaluating data expiration criteria (2116). The data expiration criteria may include a determination as to how many of the required inputs have been received by the process origination server 2004 at any moment in time. If the criteria is satisfied (2118), i.e., if all of the required inputs have been received, then the system can flag the data lock is valid through the entire data validity interval 1902 (2124). If the criteria is not satisfied, and the data expiration interval 1904 has expired (2120), then the system can invalidate, or expire, the data lock (2122). The status of the lock either being extended through the end of the data validity interval 1902 or the expiration of the data lock can be stored in the process origination server database (2126).

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for selecting an optimal data set from a plurality of candidate data sets based at least in part on a client data packet received through a web interface, the system comprising:
   a web server configured to receive one or more first data packets from a client device, wherein the one or more data packets comprise:
   information that is descriptive of a user; and
   a priority of the user;
   a cloud computing platform configured to:
   receive the one or more first data packets from the web server;
   validate at least a portion of the one or more first data packets using information imported from a first third-party computer system;
   receive second one or more data packets from a second third-party computer system, wherein the second one or more data packets are associated with the user;
   select a plurality of candidate data sets from a collection of available data sets, wherein the plurality of candidate data sets is selected from the collection of available data sets based at least in part on:
   a plurality of piecewise continuous constraint functions generated from the information that is descriptive of the user from the one or more first data packets and/or at least a portion of the second one or more data packets from the second third-party computer system; and
   a linear regression algorithm performed on each data set in the collection of data sets to determine whether each data set in the collection of data sets is eliminated by the plurality of piecewise constraint functions;
   select at least one optimal data set from the plurality of candidate data sets, wherein:
   the at least one optimal data set is selected from the plurality of candidate data sets based at least in part on the user priority; and
   the at least one optimal data set comprises one or more adjustable parameters; and
   send the at least one optimal data set to the web server;
   wherein the web server is further configured to:
   transmit the at least one optimal data set to the client device; and
   receive values for each of the one or more adjustable parameters from the client device.

2. The system of claim 1, wherein the web server is further configured to present a plurality of progressive web forms through the client device, wherein the plurality of progressive web forms are configured to receive information for the one or more first data packets, wherein the plurality of progressive web forms are presented dynamically based on received portions of the information for the one or more first data packets.

3. The system of claim 1, wherein the first one or more data packets are combined with the second one or more data packets to form a client data packet.

4. The system of claim 3, wherein the cloud computing platform is further configured to validate the client data packet against a set of validation rules.

5. The system of claim 1, wherein the cloud computing platform is further configured to:
   select the plurality of candidate data sets by identifying each data set in the collection of data sets that is not eliminated by the plurality of piecewise constraint functions.

6. The system of claim 1, wherein the cloud computing platform is further configured to:
   identify one or more historical user profiles that are similar to a user profile of the user; and
   select the at least one optimal data set from the plurality of candidate data sets by identifying one or more optimal data sets that were selected for the one or more historical user profiles.

7. The system of claim 1, wherein the cloud computing platform is further configured to:
   assign a plurality of attributes in the one or more first data packets to a plurality of factors in the plurality of candidate data sets;
   determine a weight for each of the plurality of factors based on relationships between the plurality attributes and the plurality of factors; and
   select the at least one optimal data set from the plurality of candidate data sets by calculating a score for each of the plurality of candidate data sets based on a weighted combination of the plurality of factors.

8. The system of claim 1, wherein the cloud computing platform is further configured to:
   precompute a plurality of result sets, wherein:
   each of the one or more adjustable parameters has a range of discrete possible values;
   each of the plurality of result sets comprises calculated values for each permutation of the range of discrete possible values for each of the one or more adjustable parameters; and
   the plurality of result sets are transmitted to the client device for a display that is dynamically updated in real-time as the user manipulates one or more controls without requiring an update from the web server.

9. A method for selecting an optimal data set from a plurality of candidate data sets based at least in part on a client data packet received through a web interface, the method comprising:
   receiving one or more first data packets from a client device, wherein the one or more data packets comprise:
   information that is descriptive of a user; and
   a priority of the user;
   validating at least a portion of the one or more first data packets using information imported from a first third-party computer system;
   receiving second one or more data packets from a second third-party computer system, wherein the second one or more data packets are associated with the user;
   selecting a plurality of candidate data sets from a collection of available data sets, wherein the plurality of candidate data sets is selected from the collection of available data sets based at least in part on:
   a plurality of piecewise continuous constraint functions generated from the information that is descriptive of the user from the one or more first data packets and/or at least a portion of the second one or more data packets from the second third-party computer system; and
   a linear regression algorithm performed on each data set in the collection of data sets to determine whether each data set in the collection of data sets is eliminated by the plurality of piecewise constraint functions;
   selecting at least one optimal data set from the plurality of candidate data sets, wherein:
   the at least one optimal data set is selected from the plurality of candidate data sets based at least in part on the user priority; and the at least one optimal data set comprises one or more adjustable parameters;

transmitting the at least one optimal data set to the client device; and receiving values for each of the one or more adjustable parameters from the client device.

10. The method of claim 9, further comprising:

presenting a plurality of progressive web forms through the client device, wherein:

the plurality of progressive web forms are configured to receive information for the one or more first data packets; and the plurality of progressive web forms are presented dynamically based on received portions of the information for the one or more first data packets.

11. The method of claim 9, wherein the first one or more data packets are combined with the second one or more data packets to form a client data packet.

12. The method of claim 11, further comprising validating the client data packet against a set of validation rules.

13. The method of claim 9, further comprising:

selecting the plurality of candidate data sets by identifying each data set in the collection of data sets that is not eliminated by the plurality of piecewise constraint functions.

14. The method of claim 9, further comprising:

identifying one or more historical user profiles that are similar to a user profile of the user; and selecting the at least one optimal data set from the plurality of candidate data sets by identifying one or more optimal data sets that were selected for the one or more historical user profiles.

15. The method of claim 9, further comprising:

assigning a plurality of attributes in the one or more first data packets to a plurality of factors in the plurality of candidate data sets;

determining a weight for each of the plurality of factors based on relationships between the plurality attributes and the plurality of factors; and selecting the at least one optimal data set from the plurality of candidate data sets by calculating a score for each of the plurality of candidate data sets based on a weighted combination of the plurality of factors.

16. The method of claim 9, further comprising:

precomputing a plurality of result sets, wherein:

each of the one or more adjustable parameters has a range of discrete possible values;

each of the plurality of result sets comprises calculated values for each permutation of the range of discrete possible values for each of the one or more adjustable parameters; and the plurality of result sets are transmitted to the client device for a display that is dynamically updated in real-time as the user manipulates one or more controls without requiring an update from the web server.

* * * * *